US008807544B2

(12) United States Patent
Yamamoto et al.

(10) Patent No.: US 8,807,544 B2
(45) Date of Patent: *Aug. 19, 2014

(54) LIQUID-SEALED ANTIVIBRATION DEVICE

(75) Inventors: Kentaro Yamamoto, Osaka (JP); Katsushi Saito, Osaka (JP); Gen Isawa, Osaka (JP); Tatsunori Masuda, Osaka (JP); Katsuhiro Sakurai, Aichi (JP)

(73) Assignees: Toyo Tire & Rubber Co., Ltd., Osaka-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 30 days.

This patent is subject to a terminal disclaimer.

(21) Appl. No.: 13/258,937

(22) PCT Filed: Jan. 13, 2010

(86) PCT No.: PCT/JP2010/000147
§ 371 (c)(1),
(2), (4) Date: Dec. 1, 2011

(87) PCT Pub. No.: WO2010/119595
PCT Pub. Date: Oct. 21, 2010

(65) Prior Publication Data
US 2012/0074629 A1    Mar. 29, 2012

(30) Foreign Application Priority Data

Apr. 16, 2009 (JP) ................................. 2009-100142

(51) Int. Cl.
*F16F 13/00* (2006.01)
(52) U.S. Cl.
USPC .................................................... 267/140.13
(58) Field of Classification Search
USPC .................... 267/140.11, 140.13, 141
See application file for complete search history.

(56) References Cited

U.S. PATENT DOCUMENTS 5,240,233 A * 8/1993 Kato et al. ............... 267/140.13
5,273,262 A * 12/1993 Baldini et al. ........... 267/140.13

(Continued)

FOREIGN PATENT DOCUMENTS

CN     1662755 A     8/2005
JP    61144443 A *   7/1986   ............. F16F 13/00

(Continued)

OTHER PUBLICATIONS

Japanese Office Action dated May 15, 2012, issued in corresponding Japanese Patent Application No. 2009-100142, with English translation (4 pages).

(Continued)

*Primary Examiner* — Robert A Siconolfi
*Assistant Examiner* — Charles Poon
(74) *Attorney, Agent, or Firm* — Westerman, Hattori, Daniels & Adrian, LLP

(57) ABSTRACT

In a liquid-sealed antivibration device 10 which includes: a main liquid chamber 34A where a vibration-isolating base 16 forms a portion of a chamber wall thereof; a subsidiary liquid chamber 34B where a diaphragm 36 forms a portion of a chamber wall thereof; a partition element 38 by which the main liquid chamber 34A and the subsidiary liquid chamber 34A are partitioned from each other; and an orifice flow passage 40 which allows the main liquid chamber 34A and the subsidiary liquid chamber 34B to be communicated with each other, an elastic membrane 42 is formed on the partition element 38, and the elastic membrane 42 is formed of rubber composition containing butyl rubber or halogenated butyl rubber. Due to such a constitution, an abnormal sound generated by collision of the elastic membrane 42 is reduced.

3 Claims, 13 Drawing Sheets

(56) References Cited

U.S. PATENT DOCUMENTS

| | | | |
|---|---|---|---|
| 6,158,724 A * | 12/2000 | Takashima et al. | 267/140.13 |
| 6,224,045 B1 * | 5/2001 | Muramatsu et al. | 267/140.13 |
| 6,439,554 B1 | 8/2002 | Takashima et al. | |
| 6,708,963 B2 | 3/2004 | Nishi et al. | |
| 7,334,783 B2 * | 2/2008 | Yoneyama et al. | 267/140.13 |
| 7,648,129 B2 | 1/2010 | Muraoka | |
| 7,857,293 B2 | 12/2010 | Muraoka | |
| 8,132,796 B2 | 3/2012 | Muraoka | |
| 2005/0056980 A1 | 3/2005 | Kuzukawa | |
| 2005/0127586 A1 | 6/2005 | Maeno et al. | |
| 2005/0218570 A1 | 10/2005 | Ueki | |
| 2005/0258581 A1 | 11/2005 | Tanaka | |
| 2006/0006593 A1 | 1/2006 | Bretaudeau et al. | |
| 2006/0097435 A1 * | 5/2006 | Yoneyama et al. | 267/140.11 |
| 2006/0097436 A1 * | 5/2006 | Yamamoto | 267/140.12 |
| 2006/0249891 A1 | 11/2006 | Ueki et al. | |
| 2007/0013115 A1 | 1/2007 | Katagiri et al. | |
| 2007/0085249 A1 | 4/2007 | Happou et al. | |
| 2007/0138718 A1 | 6/2007 | Muraoka | |
| 2008/0023897 A1 * | 1/2008 | Muraoka | 267/140.11 |
| 2010/0072683 A1 | 3/2010 | Saito et al. | |
| 2011/0210488 A1 * | 9/2011 | Yamamoto et al. | 267/140.13 |
| 2012/0228813 A1 | 9/2012 | Masuda et al. | |
| 2012/0248669 A1 | 10/2012 | Masuda et al. | |
| 2012/0292838 A1 * | 11/2012 | Yamamoto et al. | 267/140.13 |

FOREIGN PATENT DOCUMENTS

| | | | | |
|---|---|---|---|---|
| JP | 63203940 A * | 8/1988 | | F16F 13/00 |
| JP | 6-307491 A | 11/1994 | | |
| JP | 2000-337428 A | 12/2000 | | |
| JP | 2002-372091 A | 12/2002 | | |
| JP | 2004-003614 A | 1/2004 | | |
| JP | 2005-113954 A | 4/2005 | | |
| JP | 2006-038017 A | 2/2006 | | |
| JP | 2006-057727 A | 3/2006 | | |
| JP | 2007-046777 A | 2/2007 | | |
| JP | 2007-051713 A | 3/2007 | | |
| JP | 2007-92778 A | 4/2007 | | |
| JP | 2007-092778 A | 4/2007 | | |
| JP | 2007-107712 A | 4/2007 | | |
| JP | 2007-177973 A | 7/2007 | | |
| JP | 2007-177975 A | 7/2007 | | |
| JP | 2008-051214 A | 3/2008 | | |
| JP | 2008-069905 A | 3/2008 | | |
| JP | 2008-138854 A | 6/2008 | | |

OTHER PUBLICATIONS

Chinese Office Action dated Mar. 25, 2013, issued in corresponding Chinese Patent Application No. 201080017162.6, w/ English translation.

International Search Report of PCT/JP2010/000147, mailing date Feb. 9, 2010.

US Office Action dated May 2, 2013, issued in U.S. Appl. No. 13/063,651.

Chinese Office Action dated Dec. 17, 2012, issued in corresponding Chinese Patent Application No. 200980136015.8, w/English translation (10 pages).

Japanese Office Action dated May 29, 2012, issued in corresponding Japanese Patent Application No. 2008-238410, with English translation (4 pages).

Japanese Office Action dated May 29, 2012, issued in corresponding Japanese Patent Application No. 2008-238406, with English translation (4 pages).

Japanese Office Action dated May 29, 2012, issued in corresponding Japanese Patent Application No. 2008-242810, with English translation (4 pages).

International Search Report of PCT/JP2009/001143, date of mailing Jun. 16, 2009 (2 pages).

U.S. Notice of Allowance dated Oct. 8, 2013, issued in U.S. Appl. No. 13/063,651 (13 pages).

Corrected Notice of Allowability dated Feb. 28, 2014, issued in U.S. Patent No. 8,678,360 (U.S. Appl. No. 13/063,651).

* cited by examiner

FIG. 2
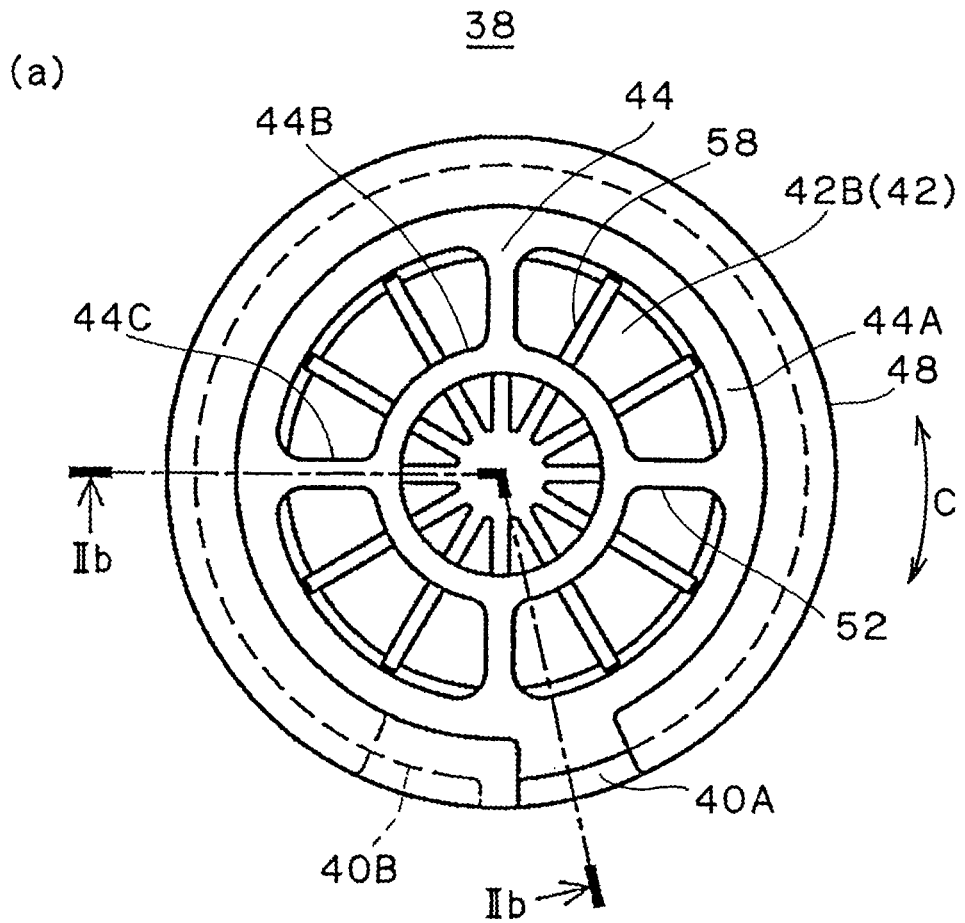
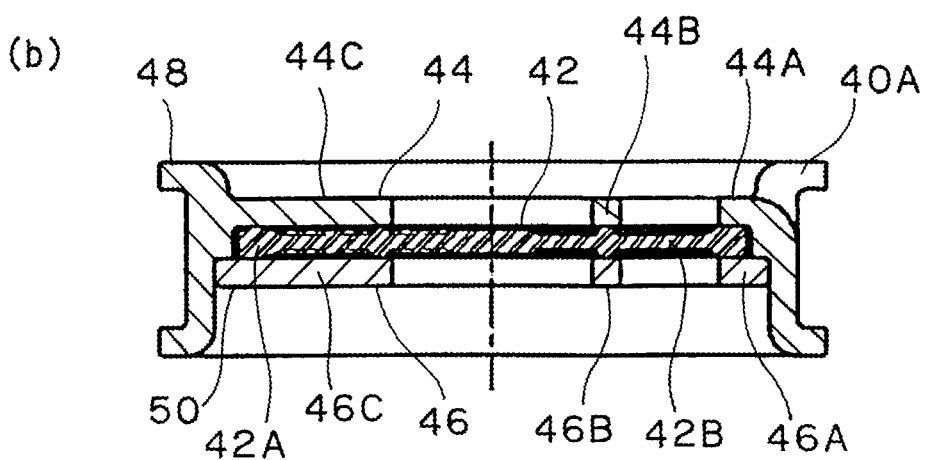

FIG. 5
(a)
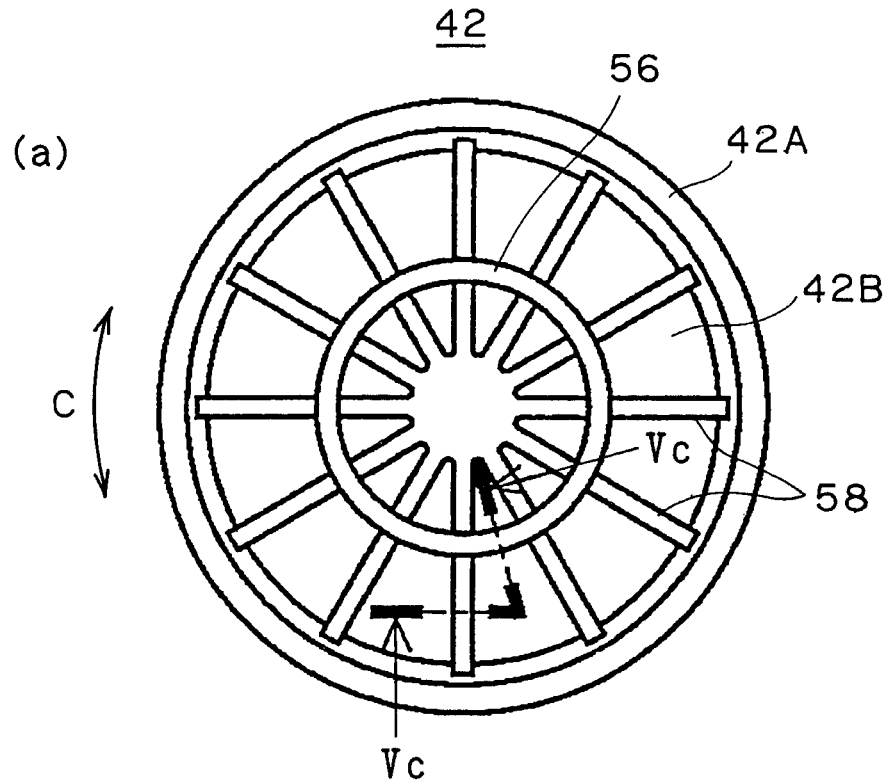
(b)
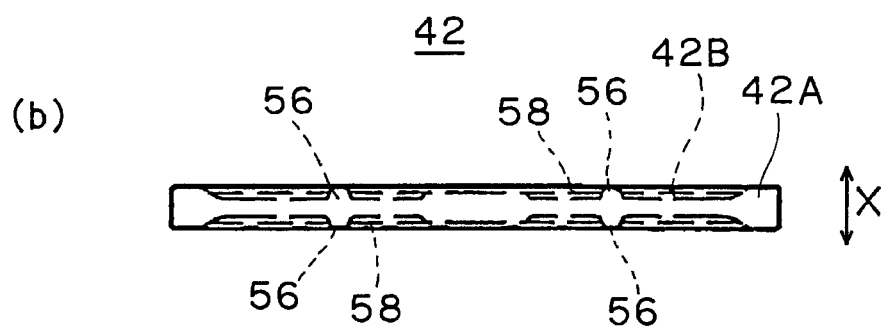
(c)
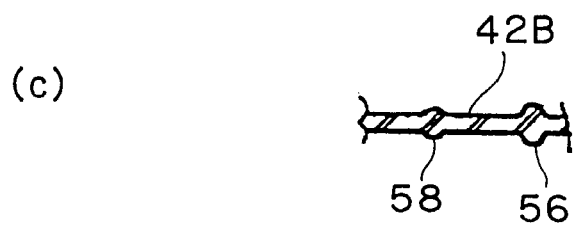

FIG. 9
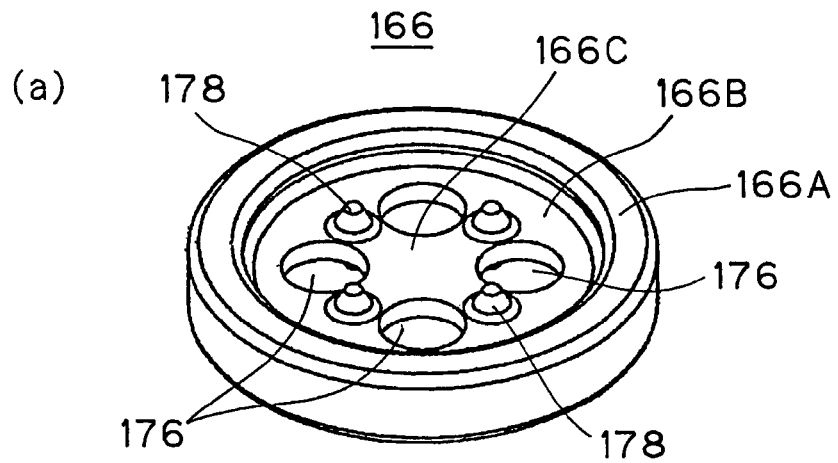
(a)
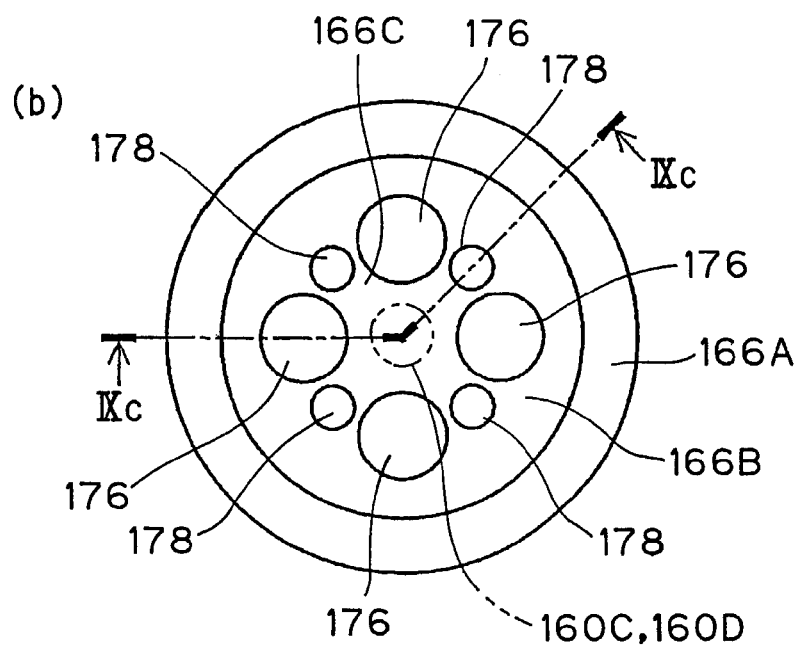
(b)
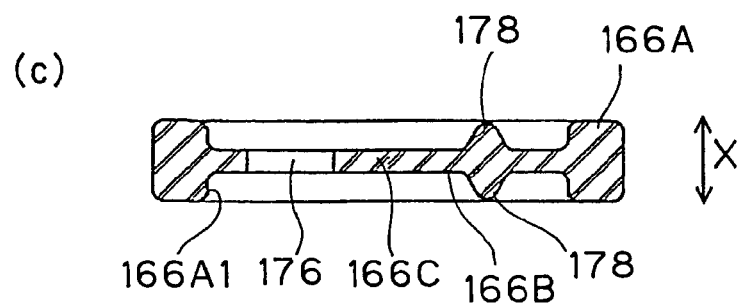
(c)

FIG. 10
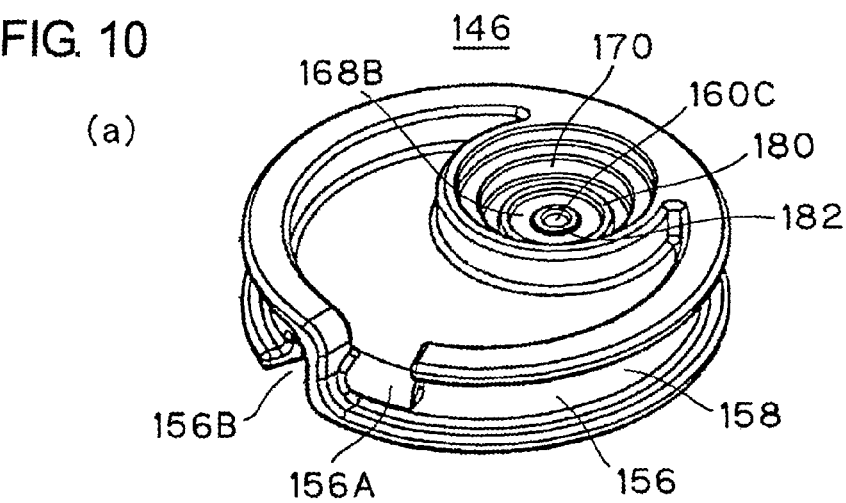
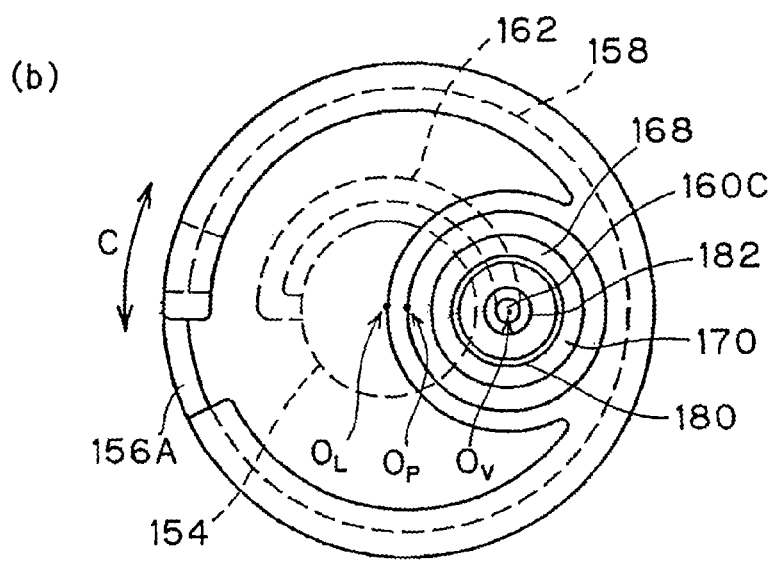
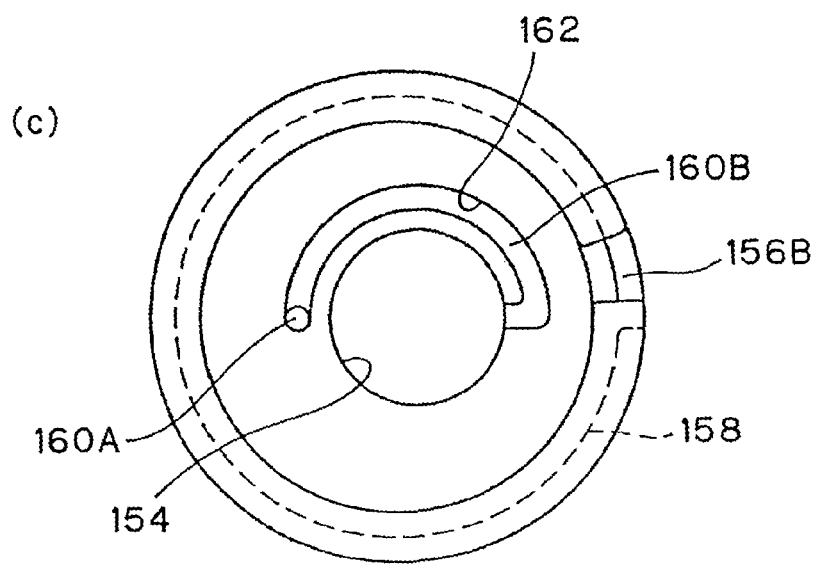

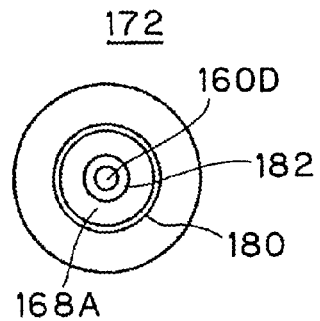
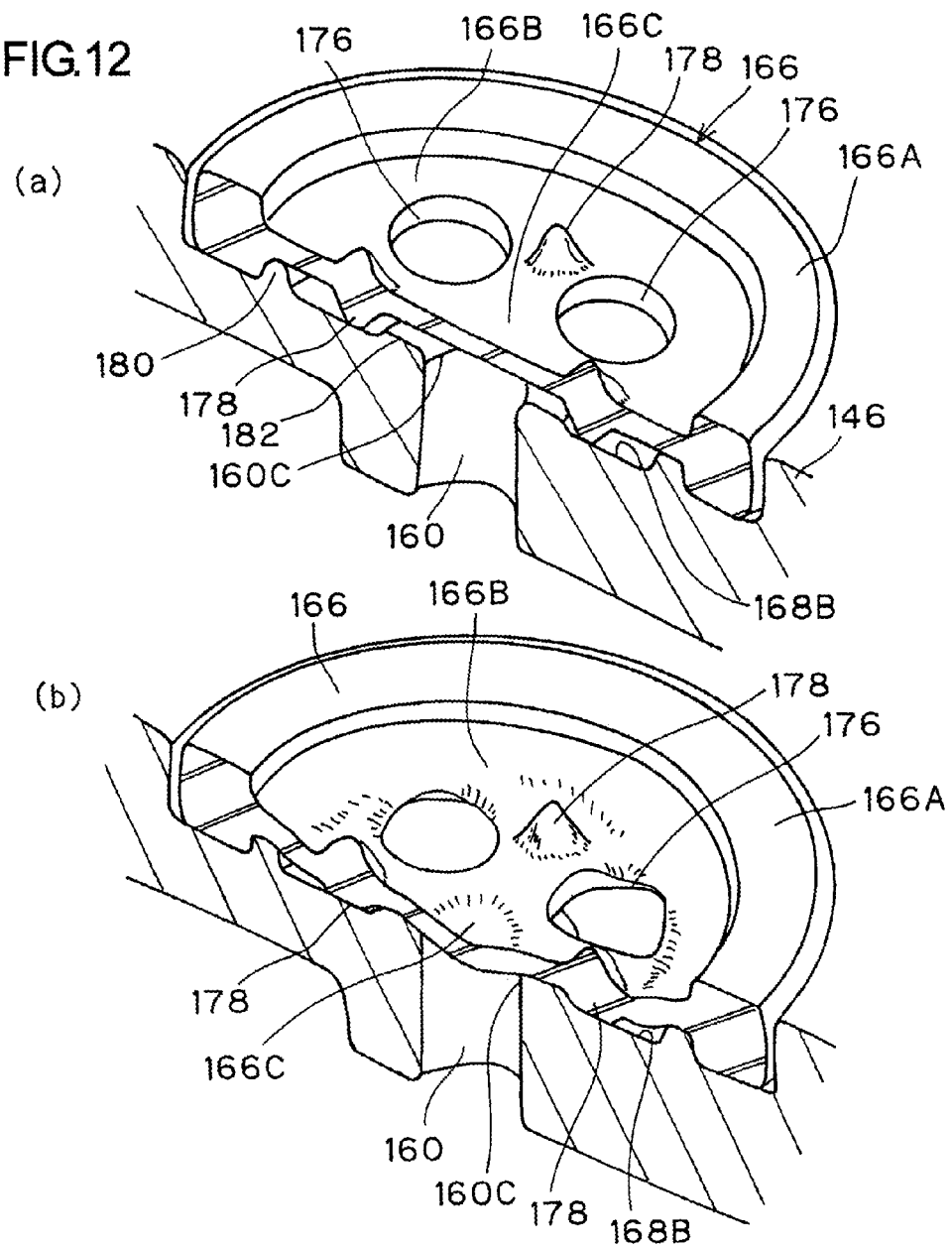

FIG. 14
(a)
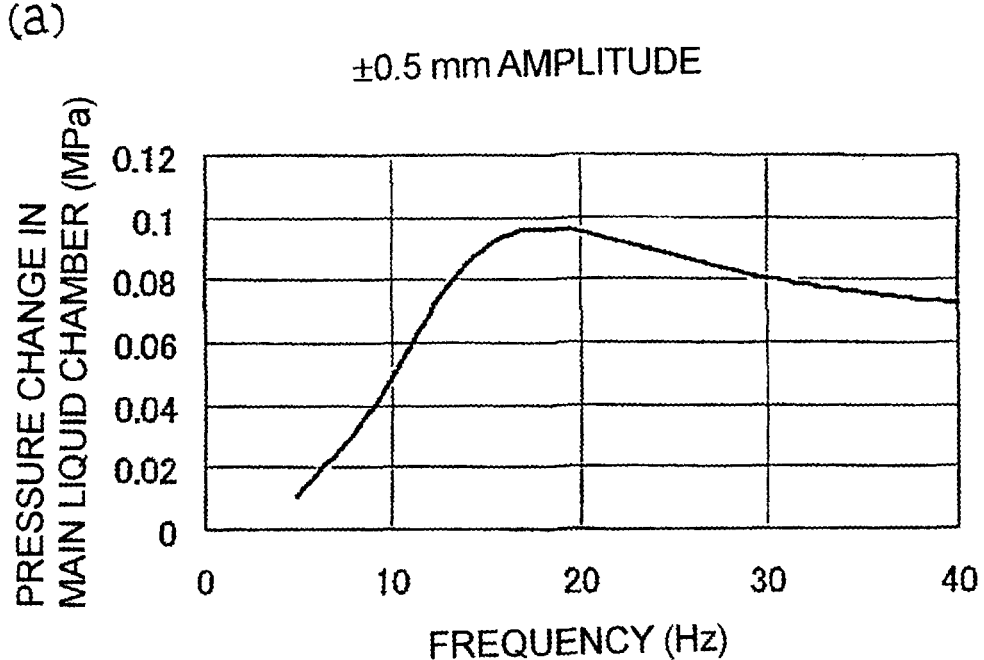
(b)
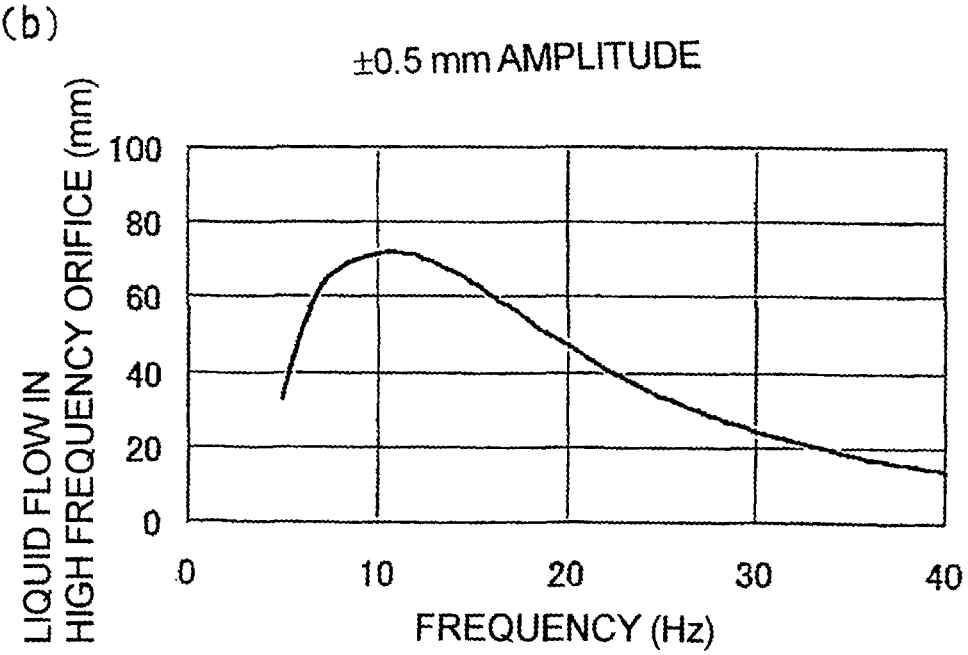

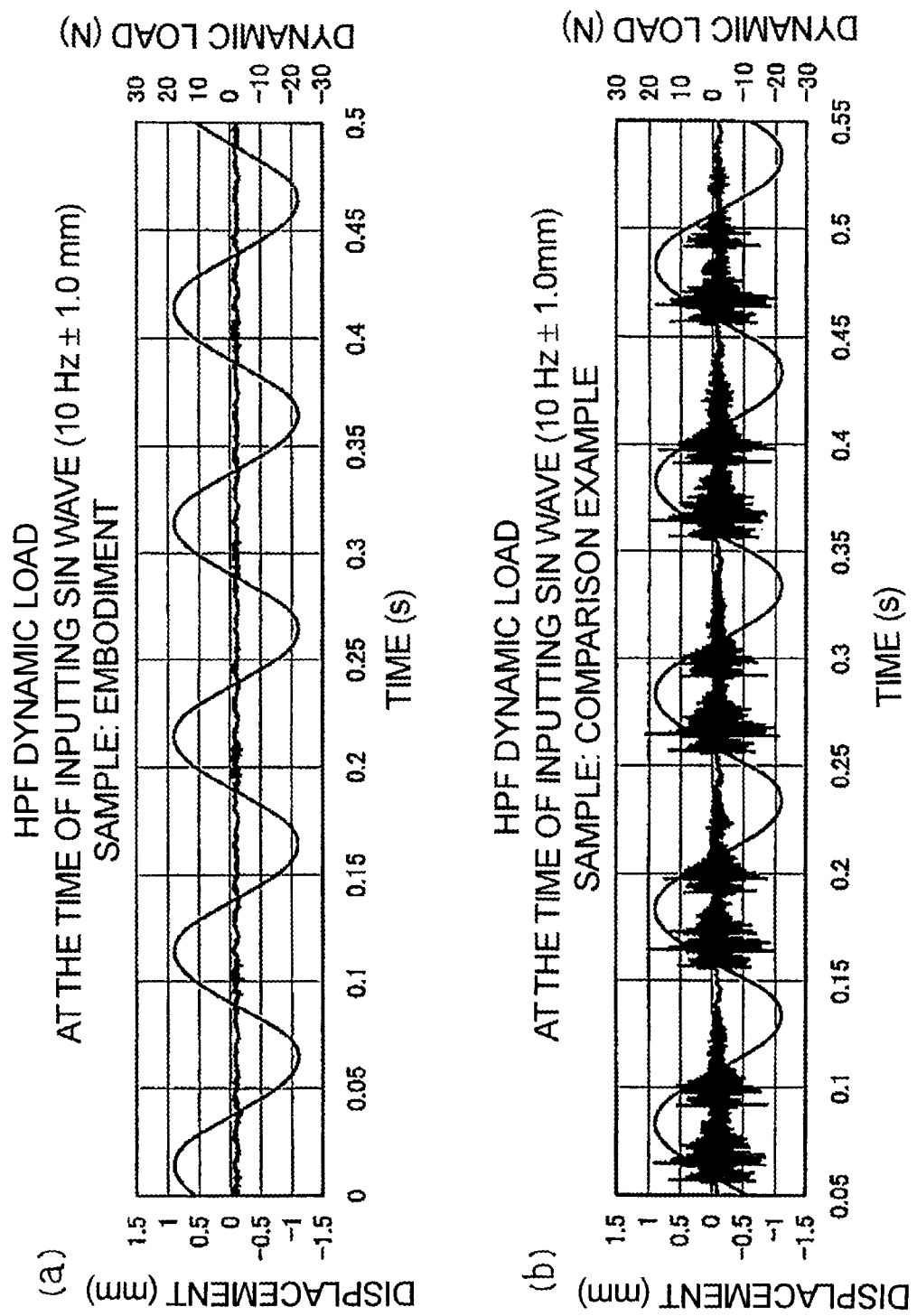

LIQUID-SEALED ANTIVIBRATION DEVICE

TECHNICAL FIELD

The present invention relates to a liquid-sealed antivibration device.

As an antivibration device such as an engine mount which supports a vibration source such as an automobile engine in a state where vibrations of the vibration source are not transmitted to a vehicle body side, there has been known a liquid-sealed antivibration device having the following constitution. That is, the liquid-sealed antivibration device includes a first mounting member which is mounted on one of a vibration source side and a support side, a second mounting member which is mounted on the other of the vibration source side and the support side, a vibration-isolating base formed of a rubber-like elastic body interposed between these mounting members, a diaphragm formed of a flexible rubber film, a main liquid chamber where the vibration-isolating base forms a portion of a chamber wall of the main liquid chamber, a subsidiary liquid chamber where the diaphragm forms a portion of a chamber wall of the subsidiary liquid chamber, and an orifice flow passage which allows these liquid chambers to be communicated with each other. Due to a liquid column resonance action brought about by the liquid flow in the orifice flow passage and a vibration control effect brought about by the vibration-isolating base, the liquid-sealed antivibration device performs a vibration damping function and a vibration isolation function.

Further, as disclosed in following patent document 1, there has been also known a liquid-sealed antivibration device where, to exhibit a low dynamic spring characteristic at the time of inputting of minute amplitude together with a high damping performance at the time of inputting of relatively large amplitude due to a liquid flow effect in an orifice flow passage, a partition element is constituted of an elastic membrane by which a main liquid chamber and a subsidiary liquid chamber are partitioned from each other, and a pair of displacement restricting members which restricts the displacement of the elastic membrane from both sides of the elastic membrane.

In this type of liquid-sealed antivibration device, there may be a case where an impact caused by collision between the elastic membrane and the displacement restricting member is transmitted to the inside of a cabin as an abnormal sound. There have been proposed various measures to prevent such an abnormal sound.

For example, the following patent document 2 discloses an idea of reducing an abnormal sound which occurs when an elastic membrane collides with a displacement restricting member by providing a thin film dampening rubber having viscoelasticity on a surface of the displacement restricting member which faces the elastic membrane in an opposed manner. However, in this case, a step for mounting the dampening rubber becomes necessary additionally, and the number of parts is increased resulting in the increase of cost.

The following patent document 3 discloses an idea of reducing an abnormal sound by using a vibration control alloy as a raw material of a displacement restricting member. In this case, however, the raw material of the displacement restricting member is not a general-purpose material and hence, cost is pushed up.

The following patent document 4 discloses an idea of reducing an abnormal sound in such a manner that a leaf spring region which is deformable is formed on a displacement restricting member, and an impact load applied to the displacement restricting member is alleviated due to the deformation of the leaf spring. In this case, however, a shape of the displacement restricting member becomes complicated so that cost is pushed up. Further, a liquid pressure in a main liquid chamber is lowered due to the deformation of the displacement restricting member and hence, there exists a possibility that an originally expected damping performance is lowered.

Patent document 1: JP-A-2006-057727
Patent document 2: JP-A-2006-038017
Patent document 3: JP-A-2007-177975
Patent document 4: JP-A-2007-177973

SUMMARY OF THE INVENTION

Problems to be Solved by the Invention

The present invention has been made under such circumstances, and it is an object of the present invention to provide a liquid-sealed antivibration device which can reduce an abnormal sound generated by the collision of an elastic membrane while suppressing the increase of cost and lowering of performances.

Means for Solving the Problems

A liquid-sealed antivibration device according to the present invention includes: a first mounting member to be mounted on one of a vibration source side and a support side; a second mounting member to be mounted on the other of the vibration source side and the support side; a vibration-isolating base formed of a rubber-like elastic body interposed between the first mounting member and the second mounting member; a main liquid chamber where the vibration-isolating base forms a portion of a chamber wall of the main liquid chamber and which is filled with a liquid; at least one subsidiary liquid chamber where a diaphragm formed of a rubber-like elastic body forms a portion of the chamber wall and which is filled with a liquid; a partition element by which the main liquid chamber and any one of the subsidiary liquid chambers are partitioned from each other; and an orifice flow passage which allows the main liquid chamber to be communicated with any one of the subsidiary liquid chambers, wherein the partition element includes an elastic membrane, and the elastic membrane is formed of rubber composition containing butyl rubber or halogenated butyl rubber.

In a first preferred mode of the present invention, in the liquid-sealed antivibration device which includes the first mounting member, the second mounting member, the vibration-isolating base, the main liquid chamber, at least one subsidiary liquid chamber, the partition element and the orifice flow passage, the partition element includes the elastic membrane by which the main liquid chamber and the subsidiary liquid chamber are partitioned from each other, and a pair of displacement restricting members which restricts a displacement of the elastic membrane from both sides of membrane surfaces of the elastic membrane, and the elastic membrane is formed of rubber composition containing butyl rubber or halogenated butyl rubber.

In a second preferred mode of the present invention, the liquid-sealed antivibration device includes the first mounting member, the second mounting member, the vibration-isolating base, the main liquid chamber, at least one subsidiary liquid chamber, a first orifice flow passage which allows the main liquid chamber and any one of the subsidiary liquid chambers to be communicated with each other, a second orifice flow passage which is tuned to a frequency band higher than a frequency band of the first orifice flow passage and allows two liquid chambers out of the main liquid chamber and the subsidiary liquid chambers to be communicated with each other, the partition element by which the main liquid chamber and any one of the subsidiary liquid chambers are partitioned from each other and in which the second orifice flow passage is formed, and the elastic membrane which constitutes a valve element for opening/closing the second orifice flow passage. A valve accommodating chamber is formed in the partition element in such a manner that the valve accommodating chamber accommodates and holds the elastic membrane in a portion of the second orifice flow passage in a direction orthogonal to a flow direction of the flow passage. The elastic membrane is held at an outer peripheral portion thereof between wall surfaces of the valve accommodating chamber, and includes inside the outer peripheral portion thereof a flexible membrane portion configured to be subjected to flexural deformation by the liquid flow in the second orifice flow passage and thereby dose an opening of the second orifice flow passage to the valve accommodating chamber provided in the partition element. The membrane portion has a communication hole through which the second orifice flow passage is communicated at a position where the membrane portion does not overlap with the opening formed in the partition element, and the second orifice flow passage is released in a state where the membrane portion is spaced apart from the opening. The elastic membrane is formed of rubber composition containing butyl rubber or halogenated butyl rubber.

Advantages of the Invention

According to the present invention, by forming the elastic membrane using butyl rubber or halogenated butyl rubber, an abnormal sound generated by the collision between the elastic membrane and a member made of a rigid material can be reduced.

According to the first mode of the present invention, an abnormal sound generated by the collision between the elastic membrane and the displacement restricting member can be reduced. Butyl rubber and halogenated butyl rubber possess low tensile strength in general and hence, it may be considered that the use of butyl rubber and halogenated butyl rubber is not suitable for forming a film-like elastic membrane which is assembled into the inside of a liquid chamber of a liquid-sealed antivibration device. However, according to the first mode of the present invention, the displacement of the elastic membrane is restricted by a pair of displacement restricting members so that the excessive flexural deformation can be suppressed and hence, it is possible to compensate for the above-mentioned defect of butyl rubber or halogenated butyl rubber whereby the elastic membrane can secure durability. Accordingly, the liquid-sealed antivibration device can reduce an abnormal sound generated by the collision of the elastic membrane while suppressing both the increase of cost and the lowering of performances.

According to the second mode of the present invention, in the same manner as the first mode, the liquid-sealed antivibration device can reduce an abnormal sound generated by the collision of the elastic membrane while suppressing the increase of cost and the lowering of performances. Further, according to the second mode, with an input of relatively small amplitude, there is no possibility that the second orifice flow passage is dosed by the elastic membrane and hence, a liquid in the second orifice flow passage can flow back and forth between the liquid chambers through the communication hole formed in the elastic membrane whereby a characteristic which makes use of the second orifice flow passage on a high frequency side can be realized. On the other hand, with an input of relatively large amplitude, the flow of the liquid in the second orifice flow passage becomes large and hence, the elastic membrane is deformed by flexure whereby the second orifice flow passage on the high frequency side is dosed. Accordingly, the liquid flows back and forth between the liquid chambers only through the first orifice flow passage on a low frequency side and hence, the higher damping performance can be secured on the low frequency side. Further, the second mode of the present invention adopts the structure which closes the second orifice flow passage due to the flexural deformation of the elastic membrane and hence, when the flow of liquid toward the elastic membrane becomes small, it is possible to return the second orifice flow passage to a release state due to a restoring force which the elastic membrane possesses. Accordingly, a biasing means such as a spring, a switching chamber for a negative pressure or the like is unnecessary and hence, the characteristics of two orifice flow passages can be changed over with the inexpensive structure.

BRIEF DESCRIPTION OF THE DRAWINGS

FIG. 2(a), (b) are views showing a partition element according to the first embodiment, wherein FIG. 2(a) is a plan view and FIG. 2(b) is a cross-sectional view taken along a line IIb-IIb in FIG. 2(a).

FIG. 3(a), (b) are views showing an orifice member which constitutes the partition element, wherein FIG. 3(a) is a plan view and FIG. 3(b) is a side view.

FIG. 4(a), (b) are views showing a partition plate member which constitutes the partition element, wherein FIG. 4(a) is a plan view and FIG. 4(b) is a side view.

FIG. 5(a), (b), (C) are views showing an elastic membrane which constitutes the partition element, wherein FIG. 5(a) is a plan view, FIG. 5(b) is a side view, and FIG. 5(c) is a cross-sectional view taken along a line Vc-Vc.

FIG. 9(a), (b), (c) are views showing an elastic membrane of the second embodiment, wherein FIG. 9(a) is a perspective view, FIG. 9(b) is a plan view, and FIG. 9(c) is a cross-sectional view taken along a line IXc-IXc.

FIG. 10(a), (b), (c) are views showing a partition element body of the second embodiment, wherein FIG. 10(a) is a perspective view, FIG. 10(b) is a plan view, and FIG. 10(c) is a bottom plan view.

FIG. 11 is a bottom plan view of a lid member of the second embodiment.

FIG. 12(a), (b) are perspective cross-sectional views showing an area around the elastic membrane of the second embodiment including the elastic membrane (the lid member is omitted), wherein FIG. 12(a) is a view at a neutral position of the elastic membrane (an open state of a second orifice flow passage), and FIG. 12(b) is a view of the elastic membrane when the elastic membrane is deformed by flexure (a dosed state of the second orifice flow passage).

FIG. 13(a), (b) are graphs showing antivibration characteristic of the liquid-sealed antivibration device according to the second embodiment, wherein FIG. 13(a) is a graph when amplitude of the antivibration characteristic is relatively small, and FIG. 13(b) is a graph when amplitude of the antivibration characteristic is relatively large.

FIG. 14(a) is a graph showing change in pressure in a main liquid chamber of the antivibration device of the second embodiment, and FIG. 14(b) is a graph showing flow of liquid in the second orifice flow passage of the antivibration device.

FIG. 15(a), (b) are graphs showing abnormal sound reduction effect when amplitude of the antivibration characteristic is large, wherein FIG. 15(a) shows dynamic bad data on the antivibration device according to the embodiment, and FIG. 15(b) shows dynamic bad data on an antivibration device according to a comparison example.

EXPLANATION OF SYMBOLS

Figure 1:
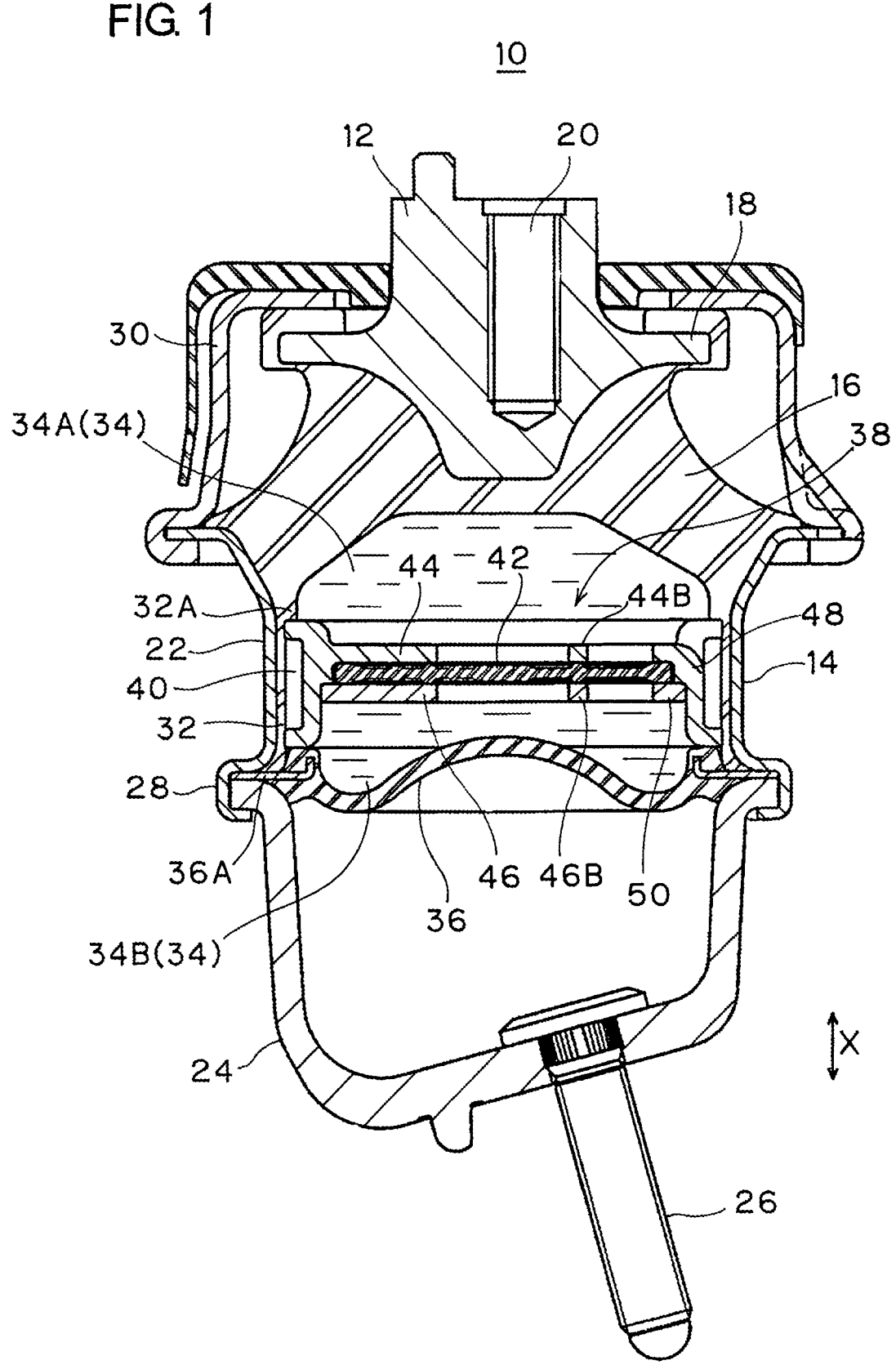
FIG. 1 is a longitudinal cross-sectional view of a liquid-sealed antivibration device according to a first embodiment.

10: liquid-sealed antivibration device 12: first mounting member 14: second mounting member 16: vibration-isolating base 34A: main liquid chamber 34B: subsidiary liquid chamber (first subsidiary liquid chamber) 34C: second subsidiary liquid chamber 36: diaphragm (first diaphragm) 38: partition element 40: orifice flow passage 42: elastic membrane 42A: outer peripheral portion 42B: flexible region 44, 46: displacement restricting member 44A, 46A: outer periphery sandwiching portion 44B, 46B: annular rib 56: displacement restricting projection 100: liquid-sealed antivibration device 140: partition element 150: second diaphragm 156: first orifice flow passage 160: second orifice flow passage 160C, 160D: opening 166: elastic membrane 166A: outer peripheral portion 166B: flexible membrane portion 168: valve accommodating chamber 176: communication hole 178: projection

MODES FOR CARRYING OUT THE INVENTION

First Embodiment (With Respect to Structure of Liquid-Sealed Antivibration Device)

A liquid-sealed antivibration device 10 according to a first embodiment is explained in conjunction with FIG. 1 to FIG. 5. The antivibration device 10 is an engine mount for supporting an engine of an automobile. The antivibration device 10 includes: an upper-side first mounting member 12 to be mounted on an engine side which constitutes a vibration source side; a lower-side cylindrical second mounting member 14 to be mounted on a vehicle body on a support side; and a vibration-isolating base 16 made of a rubber elastic body which is interposed between both mounting members 12, 14 and connects both mounting members 12, 14 to each other.

The first mounting member 12 is a boss fitting arranged along an axis of the second mounting member 14 at an upper portion of the mounting member 14, and a stopper portion 18 which projects radially outward in a flange shape is formed on the first mounting member 12. A bolt hole 20 with which a bolt not shown in the drawing is threadedly engaged is formed in an upper end portion of the first mounting member 12, and the first mounting member 12 is configured to be mounted on an engine side by means of the bolt.

The second mounting member 14 is a body fitting constituted of: a cylindrical barrel part 22 on which the vibration-isolating base 16 is formed by vulcanization molding; and a bottomed cylindrical part 24 which is connected to a lower end portion of the cylindrical barrel part 22. A bolt 26 is mounted on a bottom surface of the bottomed cylindrical part 24 in a downwardly projecting manner, and the second mounting member 14 is configured to be mounted on a vehicle body side by means of the bolt 26. A lower end portion of the cylindrical barrel part 22 is fixed to an upper end opening portion of the bottomed cylindrical part 24 by caulking by means of a caulking portion 28. Symbol 30 indicates a stopper fitting which is fixed to an upper end portion of the cylindrical barrel part 22 by caulking. The stopper fitting 30 exhibits a stopper action in a cooperating manner with a stopper portion 18 of the first mounting member 12.

The vibration-isolating base 16 is formed into an approximately umbrella shape, the first mounting member 12 is bonded to an upper portion of the vibration-isolating base 16 by vulcanization in an embedded state, and a lower end outer peripheral portion of the vibration-isolating base 16 is bonded to an upper end opening portion of the cylindrical barrel part 22 by vulcanization. A seal rubber layer 32 which covers an inner peripheral surface of the cylindrical barrel part 22 is contiguously formed with a lower end portion of the vibration-isolating base 16.

A diaphragm 36 made of a flexible rubber film is mounted on the second mounting member 14. The diaphragm 36 is arranged to face a lower surface of the vibration-isolating base 16 in an opposed manner in the axial direction X thus defining a liquid-sealed chamber 34 between the diaphragm 36 and the vibration-isolating base 16. A liquid is sealed in the liquid-sealed chamber 34. The diaphragm 36 is provided with an annular reinforcing fitting 36A on an outer peripheral portion thereof and is fixed to the caulking portion 28 by means of the reinforcing fitting 36A.

The liquid-sealed chamber 34 is defined between the lower surface of the vibration-isolating base 16 and the diaphragm 36 inside the cylindrical barrel part 22. By a partition element 38, the liquid-sealed chamber 34 is partitioned into an upper-side main liquid chamber 34A on the vibration-isolating base 16 side, that is, on a side where the vibration-isolating base 16 constitutes a portion of a chamber wall of the main liquid chamber 34A, and a lower-side subsidiary liquid chamber 34B on a diaphragm 36 side, that is, on a side where the diaphragm 36 constitutes a portion of a chamber wall of the subsidiary liquid chamber 34B. The main liquid chamber 34A and the subsidiary liquid chamber 34B are communicated with each other through a single orifice flow passage 40.

The partition element 38 is mounted on an inner side of the cylindrical barrel part 22 by fitting by way of a seal rubber layer 32, and is held in a sandwiched manner in the axial direction X between a stepped portion 32A formed on the seal rubber layer 32 and the reinforcing fitting 36A of the diaphragm 36.

The partition element 38 includes an elastic membrane 42 formed of a rubber elastic body which partitions the liquid-sealed chamber 34 into the main liquid chamber 34A and the subsidiary liquid chamber 34B, and a pair of upper and lower displacement restricting members 44, 46 which restricts the displacement of the elastic membrane 42 from both sides of membrane surfaces of the elastic membrane 42. To be more specific, in this embodiment, the partition element 38 is constituted of the elastic membrane 42, an orifice member 48 which accommodates the elastic membrane 42 on an inner peripheral surface side thereof and with which the upper displacement restricting member 44 is integrally formed, and a partition plate member 50 which is mounted on an inner peripheral surface of the orifice member 48 by fitting and constitutes the lower displacement restricting member 46.

Figure 3:
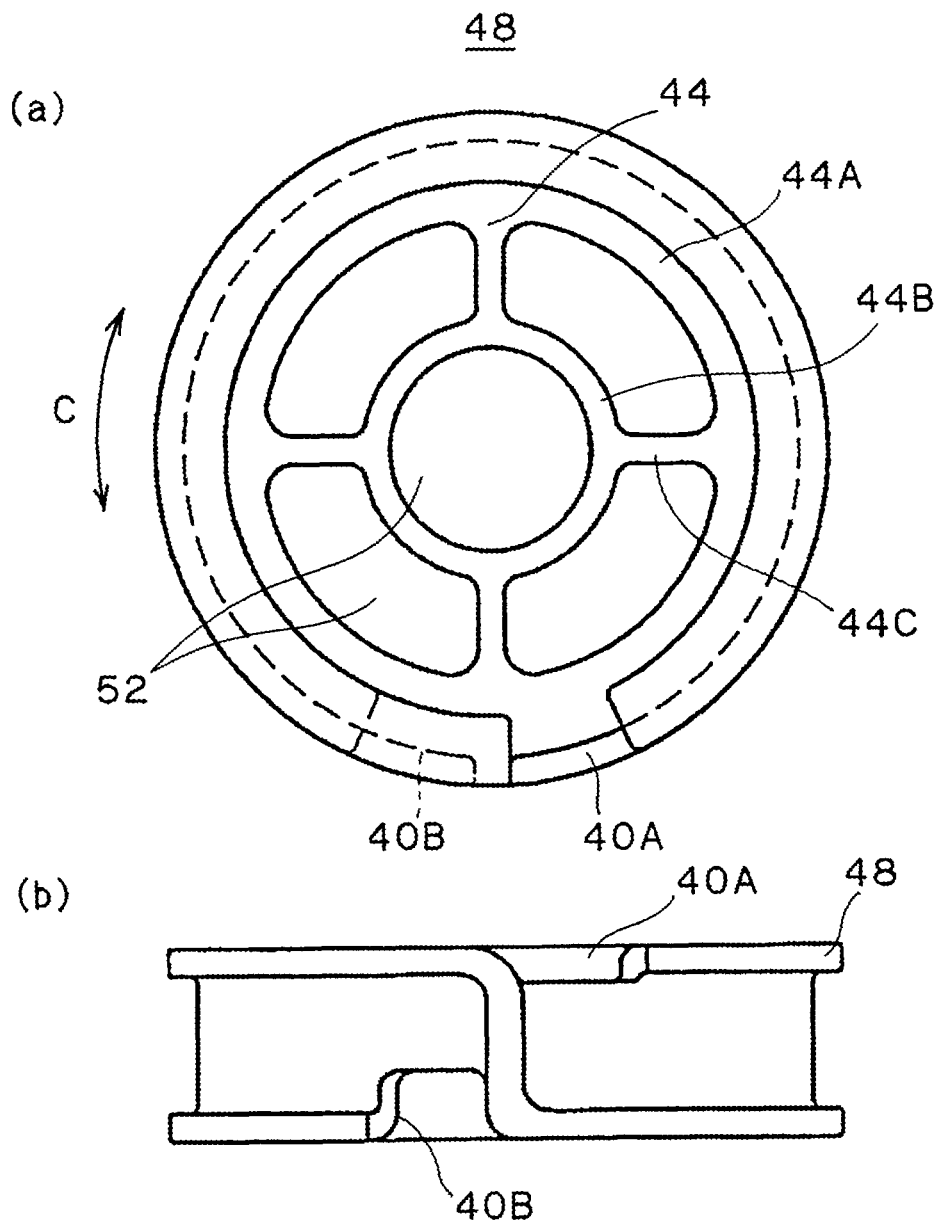

The orifice member 48 is an annular member made of a rigid material such as aluminum or a resin (in this example, a thermoplastic resin). As shown in FIG. 1, the orifice member 48 has a U-shaped cross section which is opened outward. By fitting the orifice member 48 in an inner peripheral surface of the cylindrical barrel part 22 by way of the seal rubber layer 32, the above-mentioned orifice flow passage 40 which extends in the circumferential direction is formed between the orifice member 48 and the inner peripheral surface of the cylindrical barrel part 22. As shown in FIG. 3, the orifice member 48 includes: a cutout-shaped main-liquid-chamber-side opening 40A which opens in the main liquid chamber 34A on one end thereof in the circumferential direction C; and a subsidiary-liquid-chamber-side opening 40B which opens in the subsidiary liquid chamber 34B on the other end thereof in the circumferential direction C. The orifice flow passage 40 allows the main liquid chamber 34A and the subsidiary liquid chamber 34B to be communicated with each other through these openings 40A, 40B.

As shown in FIG. 2, the displacement restricting member 44 is integrally formed on the inner peripheral surface of the orifice member 48. The displacement restricting member 44 is a member positioned on a main liquid chamber 34A side with respect to the elastic membrane 42. The displacement restricting member 44 is constituted of: a circular-ring-plate-shaped outer periphery sandwiching portion 44A which is formed on the inner peripheral surface of the orifice member 48 in an inwardly projecting manner and sandwiches the outer peripheral portion 42A of the elastic membrane 42; an annular rib 44B which is arranged annularly with respect to an axis of the displacement restricting member 44; and plural connection ribs 44C which extend in the radial direction and connect the outer periphery sandwiching portion 44A and the annular rib 44B to each other. In this embodiment, four connection ribs 44C are formed at equal intervals in the circumferential direction C. Due to such a constitution, as shown in FIG. 3, five opening portions 52 in total including one center circular opening and four arcuate openings surrounding the center circular opening are formed in the displacement restricting member 44 in a penetrating manner in the axial direction X for transmitting a change in liquid pressure in the main liquid chamber 34A to the elastic membrane 42.

Figure 4:
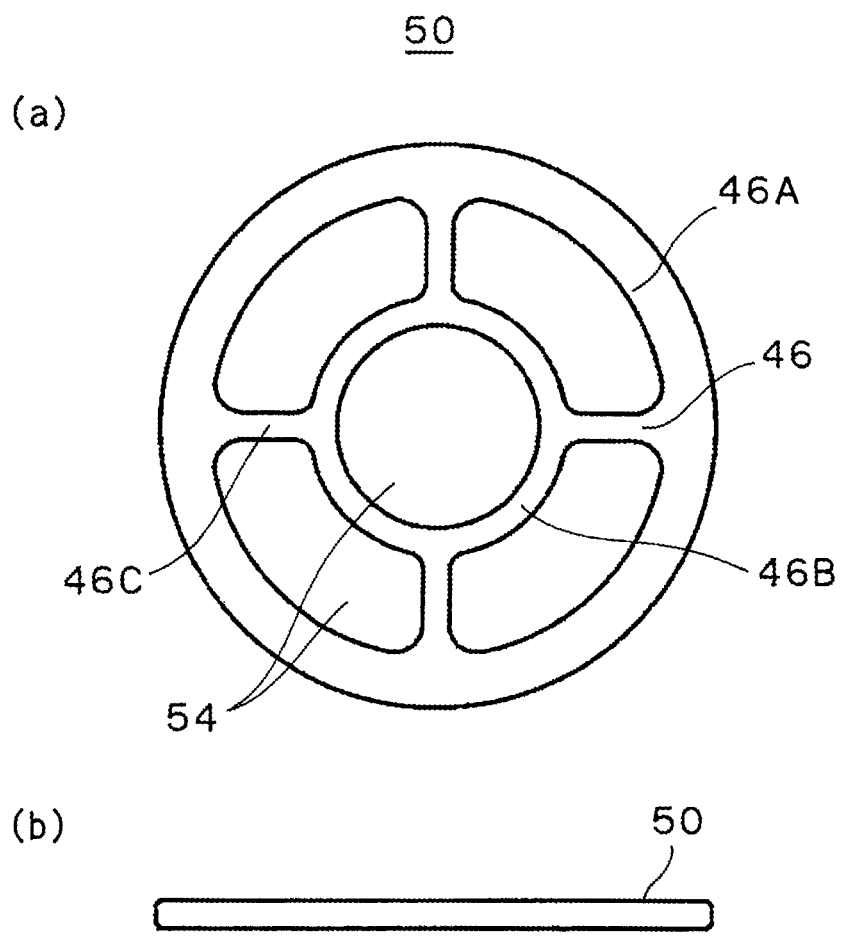

The partition plate member 50 is a plate member which is made of a rigid material such as aluminum or a resin (in this example, a thermoplastic resin) and constitutes the lower-side displacement restricting member 46. The displacement restricting member 46 is a member which is positioned on a subsidiary liquid chamber 34B side with respect to the elastic membrane 42 and sandwiches the outer peripheral portion 42A of the elastic membrane 42 together with the upper-side displacement restricting member 44. As shown in FIG. 4, the displacement restricting member 46 is constituted of a circular-ring-plate-shaped outer periphery sandwiching portion 46A which sandwiches the outer peripheral portion 42A of the elastic membrane 42, an annular rib 46B which is arranged annularly with respect to an axis of the displacement restricting member 46, and plural connection ribs 46C which extend in the radial direction and connect the outer periphery sandwiching portion 46A and the annular rib 46B to each other. An inner diameter of the outer periphery sandwiching portion 46A, positions, shapes and sizes of the annular rib 46B and the connection ribs 46C are set equal to an inner diameter of the outer periphery sandwiching portion 44A, and positions, shapes and sizes of the annular rib 46B and the connection ribs 46C of the upper-side displacement restricting member 44 respectively and hence, the repeated explanation of these values is omitted. Due to such a constitution, also in the lower-side displacement restricting member 46, opening portions 54 are formed in the lower displacement restricting member 46 in a penetrating manner in the axial direction X for transmitting a change in liquid pressure in the subsidiary liquid chamber 34B to the elastic membrane 42 in the same manner as the upper-side displacement restricting member 44.

As shown in FIG. 5, the elastic membrane 42 is a disc-shaped rubber film. In the elastic membrane 42, the outer peripheral portion 42A has a large wall thickness, and the outer peripheral portion 42A having the large wall thickness is held by being sandwiched by the outer periphery sandwiching portions 44A, 46A of the pair of displacement restricting members 44, 46 from both surface sides. That is, the upper and lower displacement restricting members 44, 46 are brought into dose contact with the outer peripheral portion 42A and hence, leaking of liquid at such a dose contact portion can be prevented.

A portion of the elastic membrane 42 positioned inside the above-mentioned outer peripheral portion 42A constitutes a flexible region 42B having a small wall thickness, and a displacement restricting projection 56 is formed on a portion of the flexible region 42B. The displacement restricting projection 56 is formed on membrane surfaces on both front and back sides, and is formed in an annular shape concentrically with an axis of the elastic membrane 42 as shown in FIG. 5(*a*). To explain in more detail, the displacement restricting projections 56 are formed annularly at positions corresponding to the annular ribs 44B, 46B of the above-mentioned displacement restricting members 44, 46 such that the displacement restricting projections 56 are brought into contact with the annular ribs 44B, 46B. The displacement restricting projection 56 is a projecting ridge which has an approximately crest-shaped cross section and extends in the circumferential direction C, and a height of the displacement restricting projection 56 is set such that a height of a peak surface of the displacement restricting projection 56 becomes equal to the membrane surface of a height of the outer peripheral portion 42A which has a large wall thickness. Due to such a constitution, the elastic membrane 42 is sandwiched between the pair of upper and lower displacement restricting members 44, 46 in a close contact state at a position where the displacement restricting projections 56 are formed.

The above-mentioned flexible region 42B is a body membrane portion having a small wall thickness which is provided inside the outer peripheral portion 42A, and is deformable by flexure in the axial direction X in response to a change in liquid pressure in the main liquid chamber 34A and the subsidiary liquid chamber 34B. On both surfaces of the flexible region 42B, auxiliary projections 58 formed of rib-shaped projections are formed for preventing breakage such as rupturing of the membrane. As shown in FIG. 5(*a*), the auxiliary projections 58 are arranged at equal intervals in the circumferential direction and extend in the radial direction from an axis to the outer peripheral portion 42A. In this example, 12 pieces of auxiliary projections 58 are arranged at intervals of 30 degrees. As shown in FIG. 5(*c*), a height of the auxiliary projection 58 is set smaller than a height of the displacement restricting projection 56 and hence, the increase in rigidity of the elastic membrane 42 as a whole can be suppressed whereby the low dynamic spring characteristic of the elastic membrane 42 at the time of inputting minute amplitude can be maintained. Here, the auxiliary projections 58 are arranged on both upper and lower surfaces of the elastic membrane 42 in symmetry.

(With Respect to Rubber Composition of Elastic Membrane)

In the above-mentioned structure, according to this embodiment, the elastic membrane 42 is made of the rubber composition containing butyl rubber or halogenated butyl rubber. That is, the rubber composition which forms the elastic membrane 42 contains butyl rubber (IIR) or halogenated butyl rubber as a rubber component, and the rubber composition may contain both butyl rubber and halogenated butyl rubber. As the halogenated butyl rubber, brominated butyl rubber (Br-IIR) and chlorinated butyl rubber (Cl-IIR) can be named. Although it is preferable that the rubber component (polymer component) is constituted of only butyl rubber or halogenated butyl rubber, diene-based rubber such as natural rubber may be also used together with butyl rubber or halogenated butyl rubber so long as the advantageous effect acquired by the use of butyl rubber or halogenated butyl rubber is not damaged.

In the rubber composition, besides the above-mentioned rubber components, various kinds of additives which are usually used in the rubber industry such as filler made of carbon black, silica or the like, zinc flower, a stearic acid, a softening agent, an antioxidant, a vulcanizing agent such as sulfur, a vulcanization accelerator can be mixed. Although mixing ratios of these additive agents are not particularly limited, for example, it is preferable that 20 to 80 parts by weight of filler is mixed for 100 parts by weight of rubber component.

The rubber composition can be obtained by a usual method, for example, by kneading rubber components and additives using a mixer such as a Banbury mixer, a kneader or open rolls, and the elastic membrane 42 can be obtained by molding the rubber composition into a predetermined shape by vulcanization molding.

(With Respect to Manner of Operation)

According to the liquid-sealed antivibration device 10 of the first embodiment having the above-mentioned constitution, the following manner of operation and advantageous effects can be acquired. That is, when vibrations of minute amplitude are inputted, the difference in liquid pressure between the main liquid chamber 34A and the subsidiary liquid chamber 34B is effectively damped by the elastic membrane 42 and hence, a dynamic spring constant can be decreased. On the other hand, when vibrations of large amplitude are inputted, the displacement of the elastic membrane 42 is restricted by the displacement restricting members 44, 46 and hence, the rigidity of the elastic membrane 42 is increased as a whole whereby the damping performance exerted by the orifice flow passage 40 can be enhanced by an amount corresponding to the increase in the rigidity.

Further, when vibrations of large amplitude are inputted, the elastic membrane 42 collides the displacement restricting members 44, 46 and hence, there exists a possibility that an abnormal sound is generated. To explain in more detail, there exists a possibility that the auxiliary projections 58 of the elastic membrane 42 collide with the connection ribs 46C of the displacement restricting members 44, 46 which face the auxiliary projections 58 in an opposed manner, or the displacement restricting projection 56 sandwiched between the annular ribs 44B, 46B is momentarily separated from the annular ribs 44B, 46B and, thereafter, collides with the annular ribs 44B, 46B due to the inputting of vibrations of large amplitude thus generating an abnormal sound. In such a case, according to this embodiment, since the elastic membrane 42 is made of butyl rubber or halogenated butyl rubber, due to the high damping performance which such a polymer possesses, a speed at which the elastic membrane 42 is deformed corresponding to a change in liquid pressure can be made small compared to a conventional generally-used elastic membrane made of natural rubber. Accordingly, kinetic energy which the elastic membrane 42 possesses when the elastic membrane 42 collides with the displacement restricting members 44, 46 can be reduced to a small amount.

Further, butyl rubber or halogenated butyl rubber has a large hysteresis loss compared to natural rubber. Accordingly, when the elastic membrane 42 is brought into contact with the displacement restricting members 44, 46, energy is largely consumed for internal heat generation. Accordingly, the collision energy transmitted to the displacement restricting members 44, 46 can be decreased. That is, assuming the kinetic energy which the elastic membrane 42 possesses as $\alpha$ and the exothermic energy of the elastic membrane 42 as $\beta$, the collision energy $\gamma$ transmitted to the displacement restricting members 44, 46 is expressed by the expression $\gamma = \alpha - \beta$. Accordingly, the collision energy $\gamma$ can be decreased by increasing $\beta$ so that an abnormal sound generated by the collision can be lowered.

Butyl rubber or halogenated butyl rubber possesses low tensile strength in general and hence, it may be considered that the use of butyl rubber or halogenated butyl rubber is not suitable for forming a film-like elastic membrane which is assembled into a liquid chamber of a liquid-sealed antivibration device. However, in this embodiment, the displacement of the elastic membrane 42 is restricted by the pair of displacement restricting members 44, 46 so that the excessive flexural deformation of the elastic membrane 42 can be suppressed and hence, the structure can compensate for the above-mentioned defect of butyl rubber or halogenated butyl rubber. Particularly, in this embodiment, the displacement restricting projection 56 having the height substantially equal to a gap formed between the displacement restricting members 44, 46 is provided to the elastic membrane 42 annularly, that is, concentrically as described above. Accordingly, a flexure amount of the elastic membrane 42 can be suppressed, and a local strain of the elastic membrane 42 caused by the deformation can be also suppressed and hence, the elastic membrane 42 can secure the durability.

As has been described above, according to this embodiment, it is possible to effectively reduce an abnormal sound generated by collision of the elastic membrane 42 with the displacement restricting members 44, 46 while suppressing the increase of cost and the lowering of performance.

Second Embodiment

A liquid-sealed antivibration device 100 according to a second embodiment is explained in conjunction with FIG. 6 to FIG. 14. The liquid-sealed antivibration device 100 is an engine mount in the same manner as the first embodiment, and the respective constitutions of a first mounting member 12, a second mounting member 14, and a vibration-isolating base 16 are equal to the constitutions of the corresponding parts of the first embodiment and hence, the same symbols are given to the identical parts and the repeated explanation of these parts is omitted. In the second embodiment, using the above-mentioned diaphragm 36 as a first diaphragm, a liquid-sealed chamber 34 is defined between the first diaphragm 36 and the vibration-isolating base 16, and the liquid-sealed chamber 34 is partitioned by a partition element 140 into an upper-side main liquid chamber 34A where the vibration-isolating base 16 constitutes a portion of a chamber wall of the upper main liquid chamber 34A and a lower-side first subsidiary liquid chamber 34B where the first diaphragm 36 constitutes a portion of a chamber wall of the subsidiary liquid chamber 34B.

The partition element 140 is constituted of a partition element body 146 which is made of a rigid material such as metal, has a circular shape as viewed in a plan view and is mounted by being fitted on an inner side of a cylindrical barrel part 22 by way of a seal rubber layer 32, and a partition support plate 148 which is arranged on a lower surface side of the partition element body 146 in a contact manner. The partition support plate 148 is a disc-shaped metal fitting having a circular opening at a center portion thereof, and a second diaphragm 150 made of a flexible rubber film is integrally formed on a center opening portion by vulcanization molding. By fixing the partition support plate 148 by the above-mentioned caulking portion 28 together with a reinforcing metal fitting 36A of the first diaphragm 36, the partition element body 146 is held in a sandwiched state in the axial direction X between a stepped portion 32A formed on the seal rubber layer 32 and the partition support plate 148.

Figure 7:
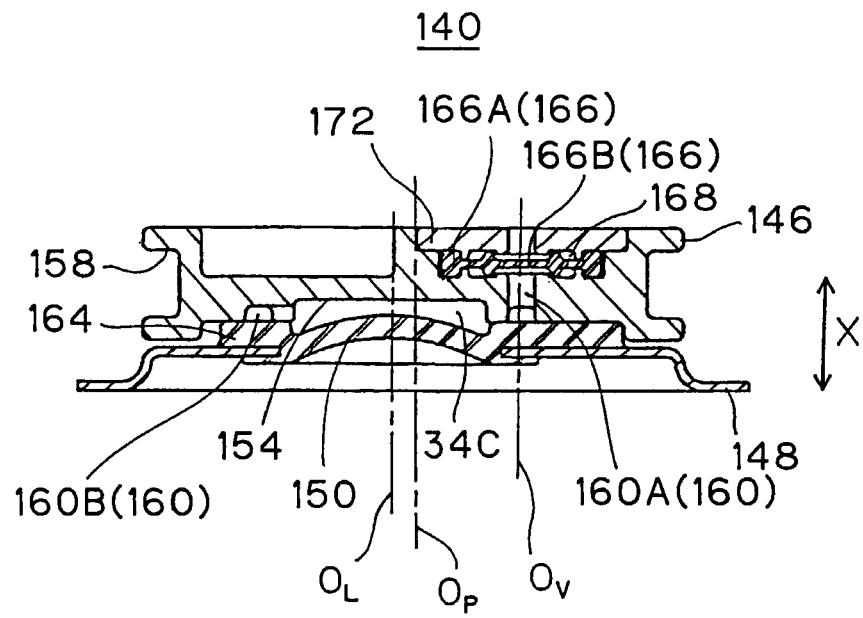
FIG. 7 is a cross-sectional view of a partition element of the second embodiment.

On a first subsidiary liquid chamber 34B side of the partition element 140, a second subsidiary liquid chamber 34C which is partitioned from the first subsidiary liquid chamber 34B by the second diaphragm 150 is formed. To describe in more detail, as shown also in FIG. 10(c), a circular recessed portion 154 is formed on a center potion of a lower surface of the partition element body 146 and the recessed portion 154 is hermetically closed by the second diaphragm 150 from below and hence, the second subsidiary liquid chamber 34C having a circular shape as viewed in a plan view where the second diaphragm 150 constitutes a portion of a chamber wall of the second subsidiary liquid chamber 34C is formed. As described above, the second subsidiary liquid chamber 34C is formed on the center portion of the partition element 140 on the first subsidiary liquid chamber 34B side. However, strictly speaking, in this example, as shown in FIG. 7 and FIG. 10(b), the second subsidiary liquid chamber 34C is arranged such that the center $O_L$ of the second subsidiary liquid chamber 34C is slightly offset radially outward from the center (axis) $O_P$ of the partition element 140.

The above-mentioned main liquid chamber 34A and the first subsidiary liquid chamber 34B are communicated with each other through a first orifice flow passage 156 which constitutes a throttle flow passage. In this embodiment, the first orifice flow passage 156 is a low frequency side orifice which is tuned to a low frequency band (for example, approximately 5 to 15 Hz) corresponding to shaking vibrations for damping shaking vibrations during vehicle traveling. That is, the first orifice flow passage 156 is tuned by adjusting a cross-sectional area and a length of the flow passage such that a damping effect based on a resonance action of a liquid which flows through the first orifice flow passage 156 is effectively exerted when the shaking vibrations are inputted.

The first orifice flow passage 156 is formed on an outer peripheral side of the partition element 140. To be more specific, the first orifice flow passage 156 which extends in the circumferential direction C (see FIG. 10(b)) is formed between a first orifice forming groove 158 which is formed on an outer peripheral portion of the partition element body 146 and is opened outward (see FIG. 10) and the above-mentioned seal rubber layer 32. As shown in FIG. 10(a), the first orifice passage 156 includes a main-liquid-chamber-side opening 156A which opens in the main liquid chamber 34A at one end in the circumferential direction C and a subsidiary-liquid-chamber-side opening 156B which opens in the first subsidiary liquid chamber 34B at the other end in the circumferential direction C.

The main liquid chamber 34A and the second subsidiary liquid chamber 34C are communicated with each other through a second orifice flow passage 160 which constitutes a throttle flow passage. The second orifice flow passage 160 is a high-frequency-side orifice which is tuned to a frequency band higher than a frequency band of the first orifice flow passage 156. In this embodiment, to reduce idling vibrations at the time of idling (a vehicle stopped state), the second orifice flow passage 160 is tuned to a high frequency band (for example, approximately 15 to 50 Hz) corresponding to idling vibrations. That is, the second orifice flow passage 160 is tuned by adjusting a cross-sectional area and a length of the flow passage such that a low dynamic spring effect based on a resonance action of a liquid which flows through the second orifice flow passage 160 is effectively exerted when the idling vibrations are inputted.

The second orifice flow passage 160 is formed on an inner peripheral side of the partition element 140, and is formed of a first flow passage portion 160A which extends in the thickness direction of the partition element 140 (equal to the above-mentioned axial direction X in this embodiment) and a second flow passage portion 160B which is connected to the first flow passage portion 160A on a first subsidiary liquid chamber 34B side of the partition element 140 and extends along the periphery of the second subsidiary liquid chamber 34C.

To be more specific, as shown in FIG. 7, the second orifice flow passage 160 is formed of the first flow passage portion 160A which penetrates the partition element body 146 in the axial direction X on a more inner peripheral side than the first orifice forming groove 158, and an arcuate second flow passage portion 160B which is formed on a lower surface of the partition element body 146 outside the second subsidiary liquid chamber 34C in the radial direction and extends in the circumferential direction C (see FIG. 10). The second orifice flow passage 160 opens in the main liquid chamber 34A at an upper end of the first flow passage portion 160A, and one end of the second flow passage portion 160B is connected to a lower end of the first flow passage portion 160A, and the other end of the second flow passage portion 160B is connected to the second subsidiary liquid chamber 34C whereby the main liquid chamber 34A and the second subsidiary liquid chamber 34C are communicated with each other. The second flow passage portion 160B is formed by hermetically sealing a second orifice forming groove 162 formed on a lower surface of the partition element body 146 in a recessed manner by a seal rubber part 164 which is integrally and contiguously formed on an upper surface of the partition support plate 148 from an outer peripheral portion of the second diagram 150.

The antivibration device 100 includes an elastic membrane 166 as a valve element which opens/closes the second orifice flow passage 160. The elastic membrane 166 is a disc-shaped (circular-film-like) rubber member, and is formed of rubber composition containing butyl rubber or halogenated butyl rubber. The detail of the rubber composition is similar to the rubber composition of the elastic membrane 42 of the first embodiment and hence, the explanation of the rubber composition is omitted.

Figure 6:
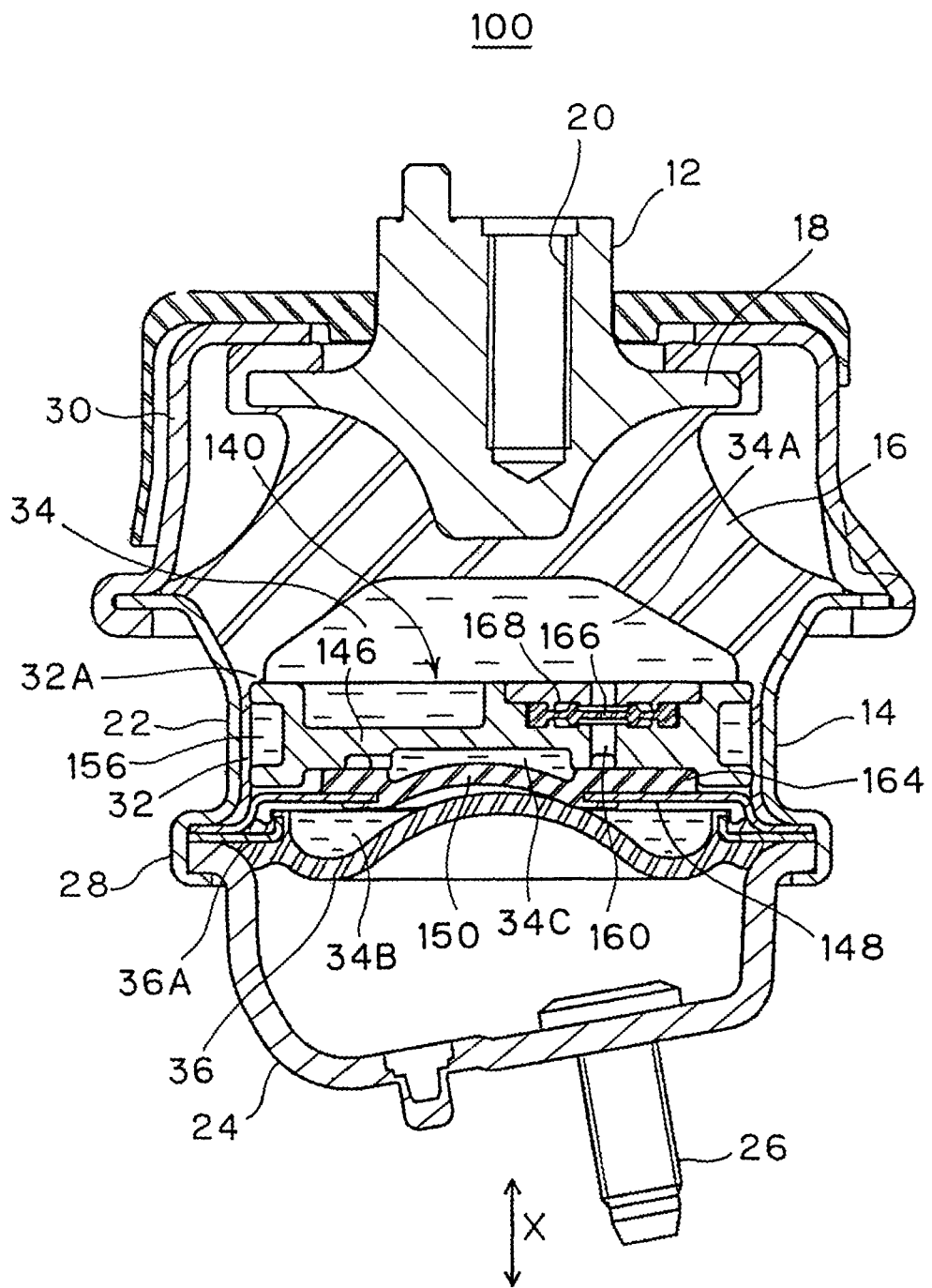
FIG. 6 is a longitudinal cross-sectional view of a liquid-sealed antivibration device according to a second embodiment.
Figure 8:
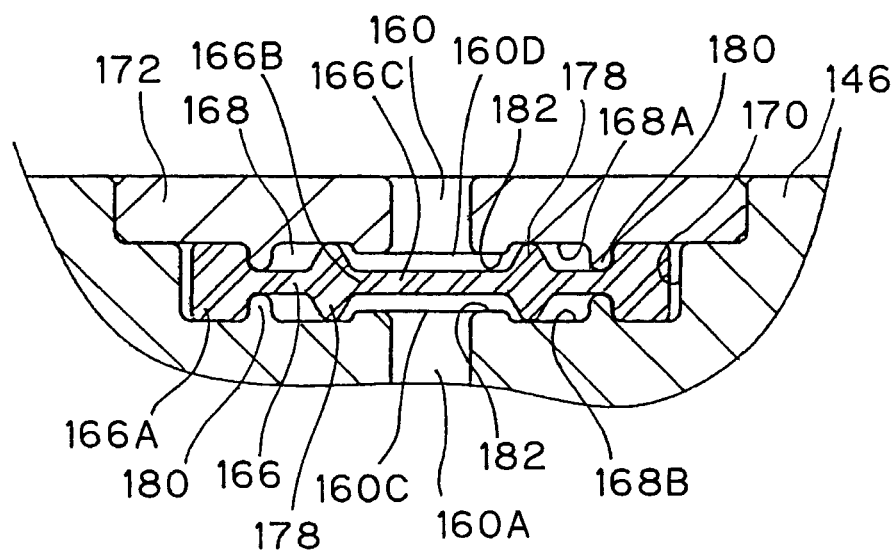
FIG. 8 is an enlarged cross-sectional view of an essential part of the partition element.

In the partition element 140, a valve accommodating chamber 168 is formed on a portion of the second orifice flow passage 160, and the elastic membrane 166 is accommodated and held in the inside of the valve accommodating chamber 168 in the direction orthogonal to the flow direction of the second orifice flow passage 160. The elastic membrane 166 is, as shown in FIG. 6 to FIG. 8, arranged in the midst of the first flow passage portion 160A of the second orifice flow passage 160 in a posture where a membrane surface of the elastic membrane 166 is arranged orthogonal to the axial direction X which is the flow direction of the first flow passage portion 160A.

To be more specific, as shown in FIG. 10(a) and FIG. 10(b), a stepped recessed portion 170 having a circular shape as viewed in a plan view is formed on an upper surface of the partition element body 146, and a disc-shaped lid member 172 made of a rigid material such as metal is fitted in and fixed to an opening side of the stepped recessed portion 170. Due to such a constitution, a space defined by the stepped recessed portion 170 and the lid member 172 forms the above-mentioned valve accommodating chamber 168. As shown in FIG. 10(b), a circular opening 160C of the second orifice flow passage 160 is formed in a center portion of the stepped recessed portion 170 and, as shown in FIG. 11, a circular opening 160D is formed in a center portion of the lid member 172 which faces the opening 160C in the axial direction X. These openings 160C, 160D form openings of the second orifice flow passage 160 leading to the valve accommodating chamber 168.

By mounting the elastic membrane 166 in the inside of the stepped recessed portion 170 and by fixing the above-mentioned lid member 172, the elastic membrane 166 is held in the inside of the valve accommodating chamber 168 in a state where the outer peripheral portion 166A is hermetically sandwiched between upper and lower wall surfaces 168A, 168B of the valve accommodating chamber 168 (that is, a lower surface of the lid member 172 and a bottom surface of the stepped recessed portion 170). As shown in FIG. 9, an outer peripheral portion 166A of the elastic membrane 166 is formed over the whole circumference with a large wall thickness, and a flexible membrane portion 166B having a small-wall-thickness film shape is provided in the inside of the outer peripheral portion 166A having a large wall thickness. The membrane portion 166B is formed such that the membrane portion 166B closes a gap defined between inner peripheral surfaces at an intermediate position of the thickness direction (axial direction X) of the outer peripheral portion 166A having a large wall thickness.

The above-mentioned membrane portion 166B is deformed by flexure (elastically deformed) in the axial direction X from a neutral position shown in FIG. 12(a) due to the flow of liquid in the second orifice flow passage 160 so that, as shown in FIG. 12(b), the membrane portion 166B closes the above-mentioned openings 160C, 160D of the second orifice flow passage 160. Accordingly, a center portion of the membrane portion 166B which faces these opening portions 160C, 160D constitute plug portions 166C which close the openings.

As shown in FIG. 9, plural communication holes 176 which are communicated with the second orifice flow passage 160 are formed in the membrane portion 166B at positions where the communication holes 176 do not overlap with the above-mentioned openings 160C, 160D, that is, at positions where the communication holes 176 and the openings 160C, 160D do not overlap with each other as viewed in the axial direction X. The communication holes 176 are arranged at plural positions on the circumference surrounding the above-mentioned plug portion 166C positioned at the center of the membrane portion 166B. In this example, four circular communication holes 176 are formed at equal intervals. The communication holes 176 are configured such that, in a state where the membrane portion 166B is separated from the above-mentioned openings 160C, 160D, that is, in a state where the plug portion 166C releases these openings (see FIG. 8), a liquid flows into the inside of the second orifice flow passage 160 through the communication holes 176 so that the second orifice flow passage 160 is released. An open area of the communication hole 176 is set, to prevent the communication hole 176 from exerting a throttle effect, such that a total area of openings of the communication holes 176 is set larger than a cross-sectional area of the second orifice flow passage 160, that is, areas of the above-mentioned openings 160C, 160D.

Further, on a membrane surface of the membrane portion 166B, plural projections 178 are formed at positions where the projections 178 do not overlap with the above-mentioned openings 1600, 160D, wherein the projections 178 are compressed between wall surfaces 168A, 168B of the valve accommodating chamber 168 which face each other due to the flexural deformation of the membrane portion 166B. As shown in FIG. 9, the projection 178 has a pyramidal shape (a conical shape in this embodiment), and the projection 178 and the above-mentioned communication hole 176 are alternately arranged on the same circumference. Further, the projections 178 are formed in a projecting manner on both upper and lower membrane surfaces of the membrane portion 166B in a vertically symmetrical manner. In this example, the projections 178 are configured such that, at a neutral position of the elastic membrane 166, distal ends of the projections 178, that is, peak portions of pyramidal shapes are approximately brought into contact with wall surfaces 168A, 168B of the valve accommodating chamber 168. However, the projections 178 may be configured such that the peak portions of the projections 178 are not brought into contact with wall surfaces 168A, 168B of the valve accommodating chamber 168 at such a neutral position.

As shown in FIG. 8, on the upper and lower wall surfaces 168A, 168B of the valve accommodating chamber 168, a ring-shaped restricting projection 180 which is brought into contact with an inner peripheral surface 166A1 (see FIG. 9(c)) of the large-wall-thickness outer peripheral portion 166A of the elastic membrane 166 thus restricting the inward displacement of the outer peripheral portion 166A is formed. That is, as shown in FIG. 10(a) and FIG. 11, the restricting projections 180 are formed on a bottom surface of the stepped recessed portion 170 and a lower surface of the lid member 172 in a vertically opposedly projecting manner.

As shown in FIG. 8, an annular projecting portion 182 which projects in the axial direction X is formed on peripheral portions of the openings 1600, 160D (see FIG. 10, FIG. 11). The annular projecting portion 182 is formed in a projecting manner toward the membrane portion 166B side opposite to the wall surfaces 168A, 168B around the annular projecting portion 182 with which the projections 178 are brought into contact. The annular projecting portion 182 is formed into a circular shape surrounding the above-mentioned circular openings 160C, 160D over the whole circumference as viewed in a plan view. A distal end surface of the annular projecting portion 182 is made flat, and a predetermined clearance is secured in the axial direction X between the flat distal end surface and the plug portion 166C at the center portion of the elastic membrane 166 which faces the distal end surface in an opposed manner.

As shown in FIG. 7, the center $O_V$ of the elastic membrane 166 is offset with respect to the center $O_P$ of the partition element 140 on a side opposite to the center $O_L$ of the second subsidiary liquid chamber 34C. That is, the elastic membrane 166 is arranged in a state where the center $O_V$ of the elastic membrane 166 is offset from the center $O_L$ of the second subsidiary liquid chamber 34 such that the first flow passage portion 160A which is opened/closed by the elastic membrane 166 does not overlap with the second subsidiary liquid chamber 34C in the thickness direction X of the partition element 140. As shown in FIG. 7 and FIG. 10(b), the elastic membrane 166 per se (see the valve accommodating chamber 168 in FIG. 10(b)) partially overlaps with the second subsidiary liquid chamber 34C as viewed from the above-mentioned thickness direction X. However, the elastic membrane 166 is arranged in an offset manner toward a peripheral portion side from the center portion of the partition element 140 such that the first flow passage portion 160A positioned at the center $O_V$ of the elastic membrane 166 does not overlap with the second subsidiary liquid chamber 34C (see the recessed portion 154 in FIG. 10(b)). In this embodiment, the center $O_V$ of the elastic membrane 166 is offset from the center $O_P$ of the partition element 140 by a value of a radius of the elastic membrane 166 or more.

According to the liquid-sealed antivibration device 100 having the above-mentioned constitution, when vibrations on a high frequency side with relatively small amplitude are inputted as in the case of idling where a vehicle is stopped, the flow of a liquid in the second orifice flow passage 160 is small and hence, the membrane portion 166B of the elastic membrane 166 is scarcely deformed by flexure. Accordingly, as shown in FIG. 12(a), there is no possibility that the second orifice flow passage 160 is dosed by the elastic membrane 166 and hence, the liquid in the second orifice flow passage 160 can flow back and forth between the main liquid chamber 34A and the second subsidiary liquid chamber 34C through the communication holes 176 formed in the elastic membrane 166. Accordingly, due to a resonance action of the liquid through the second orifice flow passage 160 on the high frequency side, the liquid-sealed antivibration device 100 exerts an excellent antivibration effect against idle vibrations.

On the other hand, when the vibrations on a low frequency side with relatively large amplitude is inputted as in the case of shaking vibrations when the vehicle travels, the flow of the liquid in the second orifice flow passage 160 becomes large and hence, the membrane portion 166B of the elastic membrane 166 is pushed in the flow direction X due to the flow of the liquid whereby the membrane portion 166B is deformed by flexure. Accordingly, as shown in FIG. 12(b), the second orifice flow passage 160 is dosed by the membrane portion 166B. As a result, the liquid flows back and forth between the main liquid chamber 34A and the first subsidiary liquid chamber 34B only through the first orifice flow passage 156 on the low frequency side and hence, the liquid-sealed antivibration device 100 exerts a high damping performance against shaking vibrations based on the resonance action of the liquid which flows in the first orifice flow passage 156.

In this manner, the liquid-sealed antivibration device 100 adopts the structure where the second orifice flow passage 160 is closed due to the deformation by flexure of the elastic membrane 166. Accordingly, when the flow of the liquid toward the elastic membrane 166 becomes small, it is possible to return the second orifice flow passage 160 to a release state by making use of a restoring force which the elastic membrane 166 possesses. As a result, even when a biasing means such as a spring is not additionally provided, the characteristics of two orifice flow passages 156, 160 can be changed over and hence, it is possible to provide a switching-type liquid-sealed antivibration device having the compact structure at a low cost.

The elastic membrane 166 is brought into contact with the wall surfaces 168A, 168B of the valve accommodating chamber 168 when the elastic membrane 166 closes the second orifice flow passage 160 and hence, there is a possibility that an abnormal sound is generated due to such a contact. However, according to this embodiment, the elastic membrane 166 is made of butyl rubber or halogenated butyl rubber and hence, in the same manner as the first embodiment, kinetic energy which the elastic membrane 166 has at the time of collision can be decreased and exothermic energy is increased whereby impact energy transmitted to the above-mentioned wall surfaces 168A, 168B which are displacement restricting members can be decreased. Accordingly, in the same manner as the first embodiment, an abnormal sound generated by the collision of the elastic membrane 166 can be effectively decreased.

As set forth above, the projections 178 are formed on the membrane portion 166B of the elastic membrane 166, and the projections 178 are compressed to the wall surfaces 168A, 168B of the valve accommodating chamber 168 as shown in FIG. 12(b) when the membrane portion 166B is deformed by flexure. Due to a repulsive force of the compressed projections 178, a restoring force of the elastic membrane 166 after flexural deformation can be further increased. Accordingly, the restoration of the elastic membrane 166 after flexural deformation can be acquired more reliably and hence, it is possible to bring the second orifice flow passage 160 into a release state more surely and smoothly.

Also when the elastic membrane 166 is deformed by flexure, as shown in FIG. 12(b), the displacement of the membrane portion 166B around the projections 178 can be suppressed and hence, a contact area between the elastic membrane 166 and the wall surfaces 168A, 168B of the valve accommodating chamber 168 when the second orifice flow passage 160 is dosed can be decreased. Accordingly, an abnormal sound generated by the collision between the elastic membrane 166 and the wall surfaces 168A, 168B can be effectively decreased.

Further, in the above-mentioned embodiment, the plural communication holes 176 and the plural projections 178 are alternately arranged on the same circumference on the elastic membrane 166 and hence, the liquid-sealed antivibration device 100 can enhance a restoring force of the elastic membrane 166 after flexural deformation, and also can acquire an excellent abnormal sound reduction effect derived from the decrease of a contact area between the elastic membrane 166 and the wall surfaces 168A, 168B.

Further, the restricting projection 180 is formed on the upper and lower wall surfaces 168A, 168B of the valve accommodating chamber 168 and hence, when the elastic membrane 166 is deformed by flexure, the restricting projection 180 is brought into contact with the inner peripheral surface of the outer peripheral portion 166A of the elastic membrane 166 so that the displacement of the elastic membrane 166 toward the inside is restricted. Accordingly, the elastic membrane 166 is scarcely displaced (moved) inward in the radial direction so that it is possible to maintain the performance of the elastic membrane 166.

Further, the wall surfaces 168A, 168B around the openings 160C, 160D which face the plug portion 166C of the elastic membrane 166 in an opposed manner are formed into the annular projecting portions 182 which project higher than the periphery of the annular projecting portions 182 and hence, the clearance between the plug portion 166C and the openings 160C, 160D which the plug portion 166C doses can be easily adjusted by setting the height of the annular projecting portion 182. Accordingly, the adjustment of an area where the second orifice flow passage 160 is dosed (input amplitude or the like) can be made easily.

Further, due to the provision of the annular projecting portion 182, a stroke until the plug portion 166C doses the openings 160C, 160D becomes small and hence, an impact at the time of contact can be alleviated. Further, due to the provision of the annular projecting portion 182, it is also possible to limit the contact between the elastic membrane 166 and the wall surfaces 168A, 168B to the annular projecting portion 182 and hence, the reduction of an abnormal sound level can be realized by reducing the contact area.

Further, in this embodiment, the elastic membrane 166 is formed on the partition element 140 in an offset manner and hence, it is possible to easily set the second orifice flow passage 160 outside the second subsidiary liquid chamber 34C in the radial direction while forming the second subsidiary liquid chamber 34C on the center portion of the partition element 140. That is, the elastic membrane 166 is arranged such that the first flow passage portion 160A which extends in the above-mentioned thickness direction X of the second orifice flow passage 160 which is opened/closed by the elastic membrane 166 does not overlap with the second subsidiary liquid chamber 34C in the thickness direction X of the partition element 140 and hence, a lower end of the first flow passage portion 160A can be directly connected to the second flow passage portion 160B around the second subsidiary liquid chamber 34C. Accordingly, it is possible to secure a length of the second orifice flow passage 160 while suppressing a thickness of the partition element 140 as small as possible. Here, assume a case where the first flow passage portion is arranged to overlap with the second subsidiary liquid chamber. In an attempt to provide the second flow passage portion around the second subsidiary liquid chamber to secure the second orifice flow passage having a large length, for connecting the first flow passage portion to the second flow passage portion, it is necessary to pull out the first flow passage portion toward the outside in the radial direction once in a state where the first flow passage portion does not overlap with the second subsidiary liquid chamber. Accordingly, it is necessary to increase the thickness of the partition element by an amount corresponding to the flow passage which extends in the radial direction and also the structure becomes complicated correspondingly. However, by offsetting the elastic membrane 166 in the above-mentioned manner, it is possible to overcome such drawbacks.

Figure 13:
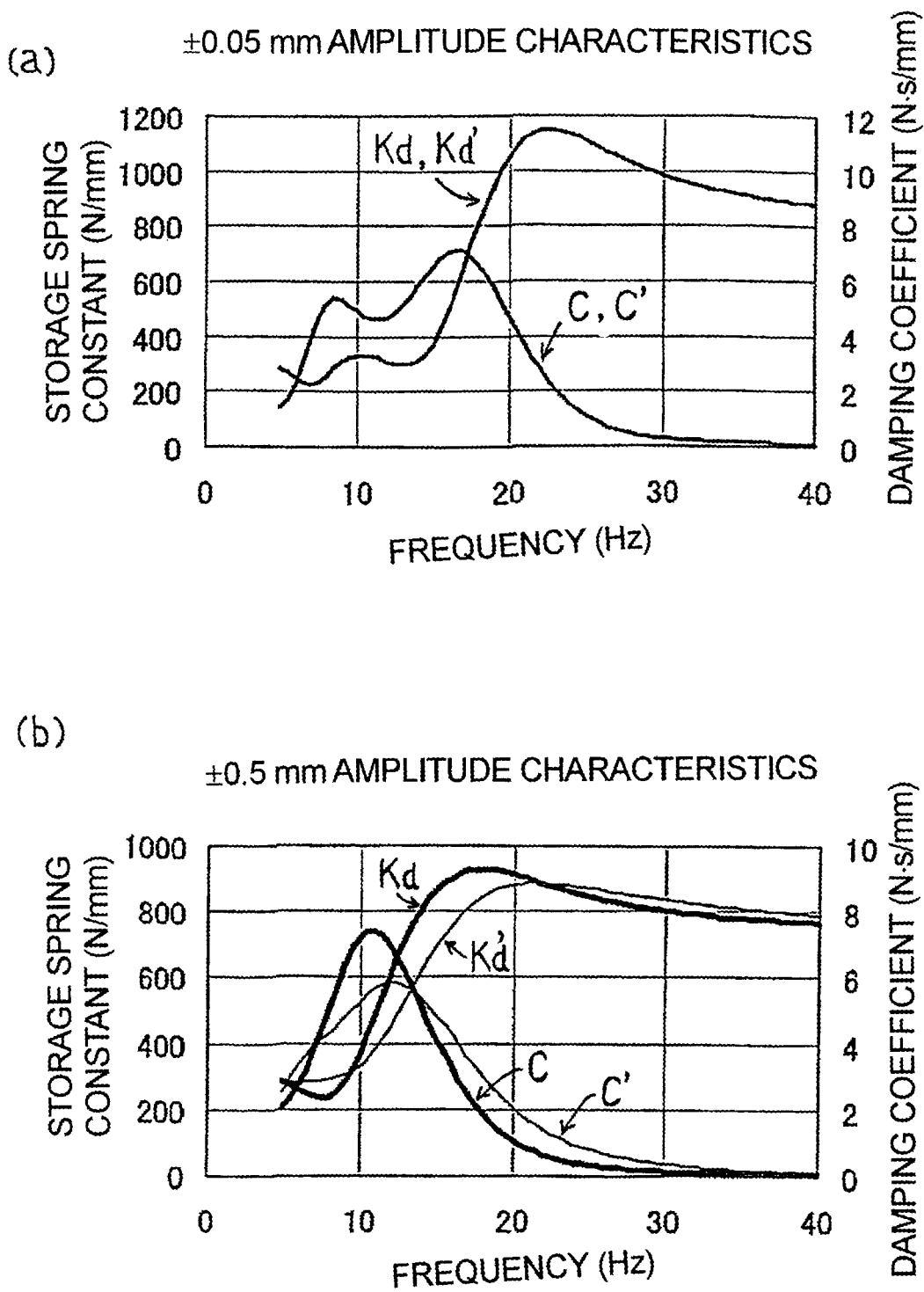

FIG. 13 is a graph showing antivibration characteristics of the liquid-sealed antivibration device 100 according to the second embodiment, wherein as a reference example for comparison, characteristics of a liquid-sealed antivibration device which omits the elastic membrane 166 but has the substantially same orifice constitution as the second embodiment are shown.

As shown in FIG. 13(a), when the amplitude is relatively small (±0.05 mm), the characteristics (the storage spring constant Kd and the damping coefficient C) of the embodiment and the characteristics (the storage spring constant Kd' and the damping coefficient C') of the reference example are equal. However, as shown in FIG. 13(b), when the amplitude is relatively large (±0.5 mm), the characteristics (the storage spring constant Kd and the damping coefficient C) of the embodiment indicated by a bold line secure the higher damping performance C on a low frequency side compared to the characteristics (the storage spring constant Kd' and the damping coefficient C') of the reference example indicated by a fine line.

FIG. 14 is a graph showing (a) the relationship between a frequency and a pressure change in the main liquid chamber 34A, and (b) the relationship between the frequency and a liquid flow in the inside of the high frequency orifice (second orifice flow passage 160) when the amplitude is relatively large (±0.5 mm) in the liquid-sealed antivibration device 100 of the second embodiment.

The pressure change in the main liquid chamber 34A is identified as the pressure difference between the main liquid chamber 34A and the second subsidiary liquid chamber 34C. As shown in FIG. 14(a), in the embodiment, a change in liquid pressure takes a maximum value at a frequency which exceeds 15 Hz slightly and the change in liquid pressure is small on a frequency side lower than 15 Hz. On the other hand, with respect to the liquid flow in the second orifice flow passage 160, as shown in FIG. 14(b), a large liquid flow is generated even at a frequency of 7 Hz. It is understood from these results that this embodiment which operates the liquid-sealed antivibration device 100 based on the liquid flow in the second orifice flow passage can expect the orifice switching characteristic at a lower frequency compared to a case where the liquid-sealed antivibration device is operated based on the pressure difference between the liquid chambers. That is, the elastic membrane 166 of this embodiment which is operated based on the liquid flow in the second orifice flow passage 160 can make the liquid flow more active from a low frequency band compared to the pressure difference and hence, the second orifice flow passage 160 can be closed at a lower frequency whereby the elastic membrane 166 of this embodiment is advantageous in damping the shaking vibrations in a low frequency band.

Other Embodiments

In the above-mentioned embodiments, only one subsidiary liquid chamber is provided in the first embodiment, and two subsidiary liquid chambers are provided in the second embodiment. However, in the present invention, provided that at least one subsidiary liquid chamber is provided, the number of subsidiary liquid chambers is not limited to such numbers.

For example, in the second embodiment, only the first subsidiary liquid chamber 34B may be provided as the subsidiary liquid chamber, and the second orifice flow passage 160 may be formed so as to allow the main liquid chamber 34A and the first subsidiary liquid chamber 34B to be communicated with each other in the same manner as the first orifice flow passage 156. Further, in the second embodiment, the second subsidiary liquid chamber may be provided on a main liquid chamber side of the partition element, the second subsidiary liquid chamber may be partitioned from the main liquid chamber by the second diaphragm, and the second orifice flow passage may be formed so as to allow the second subsidiary liquid chamber and the first subsidiary liquid chamber to be communicated with each other. In this case, with respect to the second orifice flow passage, a first flow passage portion which extends in the thickness direction of the partition element opens on a first subsidiary liquid chamber side, and a second flow passage portion which extends along the periphery of the second subsidiary liquid chamber is provided on a main liquid chamber side of the partition element and is connected to the second subsidiary liquid chamber. In this manner, in the second embodiment, it is sufficient that the second orifice flow passage allows different liquid chambers to be communicated with each other. For example, the second orifice flow passage may allow the main liquid chamber and either one of the subsidiary liquid chambers to be communicated with each other, or may allow two subsidiary liquid chambers to be communicated with each other.

Further, in the first embodiment, the elastic membrane 42 adopts the constitution where leaking of a liquid is prevented by sandwiching the outer peripheral portion 42A of the elastic membrane 42 by the pair of displacement restricting members 44, 46. However, the elastic membrane 42 may be configured such that the whole elastic membrane 42 is made movable in the axial direction X between the pair of displacement restricting members 44, 46 without sandwiching the outer peripheral portion 42A of the elastic membrane 42 by the pair of displacement restricting members 44, 46, and a liquid flows between the main liquid chamber 34A and the subsidiary liquid chamber 34B at such a portion.

Various modifications, although not enumerated here, are conceivable without departing from the gist of the present invention.

Example

Butyl-rubber-based rubber composition according to the embodiment is prepared in accordance with blending shown in a following Table 1 using a Banbury mixer. Further, Natural-rubber-based rubber composition according to a comparison example is prepared in accordance with blending shown in a following Table 2. Using the obtained rubber composition, the elastic membrane 42 of the above-mentioned first embodiment is formed by vulcanization molding in accordance with a normal method, and the elastic membrane 42 is assembled into the liquid-sealed antivibration device 10 of the first embodiment. Then, the abnormal sound performance is evaluated.

TABLE 1

| Name of raw material | parts by weight |
|---|---|
| Butyl rubber ("IIR268" made by Exxon Mobil Corportion) | 100 |
| SRF carbon black ("SEAST S" made by TOKAI CARBON CO., LIMITED.) | 50 |
| Paraffin oil ("PW-380" made by Idemitsu Kosan Co., Ltd.") | 10 |
| Zinc flower ("zinc oxide third class" made by Seido Chemical Industry Co., Ltd.) | 5.0 |
| Stearic acid (made by NOF CORPORATION) | 1.0 |
| Wax ("SUNNOC" made by OUCHI SHINKO CHEMICAL INDUSTRIAL CO., LTD) | 2.5 |
| Sulfur (containing 5% of oil, made by TSURUMI CHEMICAL INDUSTRY CO., LTD.) | 1.5 |
| Vulcanization accelerator (zinc diethyldithiocarbamate, "NOCCELER-EZ" made by OUCHI SHINKO CHEMICAL INDUSTRIAL CO., LTD.) | 0.5 |
| Vulcanization accelerator (di-2-benzothiazolyl disulfide, "NOCCELER-DM" made by OUCHI SHINKO CHEMICAL INDUSTRIAL CO., LTD.) | 0.5 |
| Vulcanization accelerator (tetramethylthiuram disulfide, "NOCCELER-TT" made by OUCHI SHINKO CHEMICAL INDUSTRIAL CO., LTD.) | 1.5 |

TABLE 2

| Name of raw material | parts by weight |
|---|---|
| Natural rubber (RSS#3) | 80 |
| Butadiene rubber ("BR150B" made by Ube Industries, Ltd.) | 20 |
| FEF carbon black ("SEAST SO" made by TOKAI CARBON CO., LIMITED.) | 16 |
| Zinc flower ("zinc oxide third class" made by Seido Chemical Industry Co., Ltd.) | 5.0 |
| Stearic acid (made by NOF CORPORATION) | 1.0 |
| Wax ("SUNNOC" made by OUCHI SHINKO CHEMICAL INDUSTRIAL CO., LTD) | 2.0 |
| Antioxidant 6C (N-phenyl-N'-(1,3-methylbutyl)p-phenylenediamine) | 1.0 |
| Antioxidant RD (2,2,4-trimethyl-1,2-dihydroquinoline polymer) | 1.0 |
| Sulfur (containing 5% of oil, made by TSURUMI CHEMICAL INDUSTRY CO., LTD.) | 1.5 |
| Vulcanization accelerator CZ (N-cyclohexyl-2-benzothiazolylsulfenamide) | 1.5 |
| Vulcanization accelerator TS (tetramethylthiuram monosulfide) | 0.3 |

The evaluation is made as follows with respect to the respective antivibration devices 10 of the embodiment and the comparison example. Sinusoidal vibrations (10 Hz) of ±1.0 mm corresponding to large-amplitude vibrations are inputted between the first mounting member 12 and the second mounting member 14, an output obtained by such inputting is subjected to a high pass filter and only bad components of 100 Hz or more are taken out, and data on an obtained dynamic bad (N) is shown in FIG. 15.

As a result, although the dynamic bad is large in the comparison example which uses natural-rubber-based rubber composition shown in FIG. 15(b) for forming the elastic membrane 42, the dynamic load is scarcely detected in the embodiment which uses butyl-rubber-based rubber composition shown in FIG. 15(a) for forming the elastic membrane 42 so that the embodiment is remarkably excellent in an abnormal sound reduction effect compared to the comparison example.

INDUSTRIAL APPLICABILITY

The present invention is applicable to various antivibration devices such as a body mount, a differential gear mount besides an engine mount, for example.

The invention claimed is:

1. A liquid-sealed antivibration device comprising:
a first mounting member to be mounted on one of a vibration source side and a support side;
a second mounting member to be mounted on the other of the vibration source side and the support side;
a vibration-isolating base formed of an elastic body interposed between the first mounting member and the second mounting member;
a main liquid chamber where the vibration-isolating base forms a part of a chamber wall of the main liquid chamber;
at least one subsidiary liquid chamber where a diaphragm formed of an elastic body forms a part of a chamber wall of the at least one subsidiary liquid chamber;
a partition element by which the main liquid chamber and any one of the at least one subsidiary liquid chamber are partitioned from each other; and
a first orifice flow passage which allows the main liquid chamber to be communicated with any one of the at least one subsidiary liquid chamber, and
a second orifice flow passage which is tuned to a frequency band higher than a frequency band of the first orifice flow passage and allows two liquid chambers out of the main liquid chamber and the at least one subsidiary liquid chamber to be communicated with each other,
wherein the partition element includes an elastic membrane, and the elastic membrane is made of rubber composition containing butyl rubber or halogenated butyl rubber;
wherein the second orifice flow passage is formed in the partition element,
wherein the elastic membrane is formed as a valve element for opening and closing the second orifice flow passage,
wherein a valve accommodating chamber is formed in the partition element in such a manner that the valve accommodating chamber accommodates and holds the elastic membrane in a portion of the second orifice flow passage in a direction orthogonal to a flow direction of the flow passage,
wherein the elastic membrane is held at an outer peripheral portion thereof between wall surfaces of the valve accommodating chamber, and includes inside the outer peripheral portion thereof a flexible membrane portion configured to be subjected to flexural deformation by liquid flow in the second orifice flow passage and thereby close an opening of the second orifice flow passage to the valve accommodating chamber provided in the partition element, and wherein the membrane portion has a communication hole through which the second orifice flow passage is communicated at a position where the membrane portion does not overlap with the opening formed in the partition element, and the second orifice flow passage is released in a state where the membrane portion is spaced apart from the opening.

2. The liquid-sealed antivibration device according to claim 1, wherein a projection which is configured to be compressed to an opposed wall surface of the valve accommodating chamber by flexural deformation of the membrane portion is formed on a membrane surface of the membrane portion at a position where the membrane portion does not overlap with the opening formed in the partition element.

3. The liquid-sealed antivibration device according to claim 1, wherein the communication hole is formed at a plurality of positions arranged on a circumference which surrounds a plug portion positioned at the center of the membrane portion, and the projection is formed alternately with the communication hole at a plurality of positions on the circumference.

* * * * *